United States Patent
Neely, III et al.

(10) Patent No.: US 7,646,394 B1
(45) Date of Patent: Jan. 12, 2010

(54) SYSTEM AND METHOD FOR OPERATING IN A VIRTUAL ENVIRONMENT

(75) Inventors: Howard Neely, III, Manhattan Beach, CA (US); Jason Fox, Thousand Oaks, CA (US); Mathias Kolsch, Pacific Grove, CA (US); Matt Shomphe, Los Angeles, CA (US); Jason Jarald, Chapel Hill, NC (US); Mike Daily, Thousand Oaks, CA (US)

(73) Assignees: HRL Laboratories, LLC, Malibu, CA (US); Raytheon Systems, Waltham, MA (US)

( * ) Notice: Subject to any disclaimer, the term of this patent is extended or adjusted under 35 U.S.C. 154(b) by 540 days.

(21) Appl. No.: 11/075,354

(22) Filed: Mar. 7, 2005

Related U.S. Application Data

(60) Provisional application No. 60/550,808, filed on Mar. 5, 2004.

(51) Int. Cl.
*G09G 5/00* (2006.01)
*G06T 15/00* (2006.01)
*G06F 3/033* (2006.01)
(52) U.S. Cl. .................. 345/633; 345/419; 715/863
(58) Field of Classification Search ................ 345/419, 345/633; 715/863
See application file for complete search history.

(56) References Cited

U.S. PATENT DOCUMENTS

| | | |
|---|---|---|
| 3,739,347 A | 6/1973 | Forsberg |
| 4,734,690 A | 3/1988 | Waller |
| 4,847,605 A | 7/1989 | Callahan et al. |
| 4,987,527 A | 1/1991 | Hamada et al. |
| 5,019,809 A | 5/1991 | Chen |
| 5,179,656 A | 1/1993 | Lisle |
| 5,276,785 A | 1/1994 | Mackinlay et al. |
| 5,315,313 A | 5/1994 | Shinagawa |
| 5,319,747 A | 6/1994 | Gerrissen et al. |
| 5,359,703 A | 10/1994 | Robertson et al. |
| 5,689,628 A | 11/1997 | Robertson |
| 5,714,698 A | 2/1998 | Tokioka et al. |
| 5,742,263 A | 4/1998 | Wang et al. |
| 5,808,613 A | 9/1998 | Marrin et al. |

(Continued)

OTHER PUBLICATIONS

Advanced Visual Systems: http://www.avs.com, Jun. 28, 2004.

(Continued)

*Primary Examiner*—Ryan R Yang
(74) *Attorney, Agent, or Firm*—Tope-McKay & Assoc.

(57) ABSTRACT

The present invention relates to a system, method and computer program product for enabling user interaction with objects in a virtual environment independently of apparent virtual viewpoint altitude, by non-linearly scaling the virtual actuator. In doing so, the system receives a virtual-viewpoint position and a virtual actuator position from a virtual environment processing subsystem, and a real-viewpoint position and a real-actuator position from a real-world environment tracking subsystem. An xy-scale factor is then calculated based on the virtual-viewpoint position. A non-linear mapping is thereafter calculated between a real dataset and a virtual dataset based on the xy-scale-factor. The real dataset comprises the real-actuator position and the real-viewpoint position in the real-world environment, and the virtual dataset comprises the virtual-actuator position and the virtual-viewpoint position in the virtual environment.

20 Claims, 14 Drawing Sheets

U.S. PATENT DOCUMENTS

| | | | |
|---|---|---|---|
| 5,936,612 | A | 8/1999 | Wang |
| 6,009,210 | A | 12/1999 | Kang |
| 6,154,723 | A | 11/2000 | Cox et al. |
| 6,160,551 | A | 12/2000 | Naughton et al. |
| 6,281,877 | B1 | 8/2001 | Fisher et al. |
| 6,289,299 | B1 | 9/2001 | Daniel, Jr. et al. |
| 6,497,649 | B2 | 12/2002 | Parker et al. |

OTHER PUBLICATIONS

Feibush, E., N. Gagvani, and D. Williams. 2000. "Visualization for situational awareness". IEEE Computer Graphics and Applications. Sep./Oct. 2000. pp. 38-45.

Poupyrev, I. et al, "The Go-Go Interaction Technique: Non-Linear Mapping for Direct Manipulation in VR", ACM Symposium on User Interface Software and Technology, 1996, pp. 79-80.

Song, D., M. Norman (1993) "Nonlinear Interactive Motion Control Techniques for Virtual Space Navigation", IEEE Virtual Reality Annual International Symposium (VRAIS), Sep. 18-22, Seattle, Washington, 111117. http://citeseer.nj.nec.com/song93nonlinear.html.

Zaiane, O. And A. Ammoura. 2001. "On-line analytical processing while immersed in a Cave".

Bolter J., Bowman D.A., Hodges L.F., The Virtual Venue: User-Computer Interaction In Information-Rich Virtual Environments, 1998.

Bowman, D.A., Interaction Techniques for Common Tasks in Immersive Virtual Environments, Georgia Institute of Technology, Jun. 1999.

Bowman, D. Interaction Techniques for Immersive Virtual Environments: Design, Evaluation, and Application. Human-Computer Interaction Consortium (HCIC) Conference, 1998.

Bowman, D. A. and Hodges, L. F. (1997). An evaluation of techniques for grabbing and manipulating remote objects in immersive virtual environments. In 1997 Symposium on Interactive 3D Graphics, pp. 35-38.

Two Pointer Input For 3D Interaction, 1997, Robert C. Zeleznik, Andrew S. Forsberg, Paul S. Strauss, Symposium on Interactive 3D Graphics.

Lindeman, R., J. Sibert, and J. Hahn. Hand-Held Windows: Towards Effective 2D Interaction in Immersive Virtual Environments. IEEE Virtual Reality, 1999.

Bowman, D., Kruijff, E., LaViola, J., and Poupyrev, I."An Introduction to 3D User Interface Design." Presence: Teleoperators and Virtual Environments, vol. 10, No. 1, 2001, pp. 96-108.

Hultquist, Jeff, "A Virtual Trackball," In Graphics Gems, Andrew S. Glassner (ed.), Academic Press, Inc., San Diego, California, 1990, pp. 462-463.

Kettner, Lutz. "A classification scheme of 3D interaction techniques." Technical Report B95-05, Freie Universitat Berlin, Apr. 1995.

Kwon, Taewook, T. Kim, Y.-C. Choy. 1999. "A new navigation/traveling method in virtual environment." TENCON 99. IEEE Region 10 Conference, vol. 1, 1999. pp. 348-351.

Time's Up (http://www.timesup.orq/), Spherical Projection Interface (SPIN), Jun. 28, 2004.

Wartell, Zachary, William Ribarsky, Larry Hodges. 1999. "Third-Person Navigation of Whole-Planet Terrain in a Head-tracked Stereoscopic Environment". 1999 IEEE Virtual Reality Conference (Mar. 13-17, 1999, Houston TX).

Watsen, K., Darken, R., & Capps, M. (1999). "A handheld computer as an interaction device to a virtual environment." Third Immersive Projection Technology Workshop.

Andersen, G. J., Braunstein, M. L. 1985. Induced self-motion in central vision. Journal of Experimental Psychology: Human Perception and Performance II, 122-132.

Daily, M., Howard, M., Jerald, J., Lee, C., Martin, K., McInnes, D., Tinker, P.. Smith, R. 2000. Distributed Design Reviews in Virtual Environments. In Proceedings of CVE 2000, San Francisco, CA, Sep. 2000.

Dichgans, J., Brandt, T. 1978. Visual-Vestibular Interaction: Effects of Self-Motion Perception and Postural Control. In Handbook of Sensory Psychology, vol. VIII: Perception, Springer-Verlag, R. Held, H. W. Leibowitz and H. L. Teuber, Eds., Berlin,.

Hettinger, L. J., Riccio, G. E. 1992. Visually Induced Motion Sickness in Virtual Environments. Presence 1, 3, 311-318.

Laviola, J. J. 2000. A Discussion of Cybersickness in Virtual Environments. ACM SIGCHI Bulletin 32, 1, 47-56.

Martin, K. 1999. Creation and Performance Analysis of User Representations in Collaborative Virtual Environments. ACM Computing Surveys Journal. ACM Press.

McCauley, M. E., Sharkey, T. J. 1992. Cybersickness: Perception of Self-Motion in Virtual Environments. Presence 1, 3, 31 1-318.

Parker. D. E., Duh, B. H., Furness, T. A., Prothero, J. D., Seibel, E. J. 2002. Alleviating motion, simulator, and virtual environmental sickness by presenting visual scene components matched to inner ear vestibular sensations. U.S. patent 6,497,649.

Ramey, C. 2000. Boeing Demonstrates Ways to Reduce Joint Strike Fighter Maintenance, Life-Cycle Costs. Boeing Company press release. Jun. 28, 2000. http://www.boeing.com/news/releases/2000/news_release_000628n.htm.

Rensink, R. A., O'Regan, J. K., Clark, J. J. 1997. To See or Not to See: The Need for Attention to Perceive Changes in Scenes. Psychological Science 8, 368-373.

Schunck, G. 1984. The Motion Constraint Equation for Optical Flow. In Proceedings of the International Conference on Pattern Recognition, Montreal, P.O., Canada, 1993, 20-22.

Sharkey. T. J., McCauley, M. E. 1999. The effect of global visual flow on simulator sickness. In Proceedings of the AIAA/AHS Flight Simulation Technologies Conference, American Institute of Aeronautics and Astronautics, Washington, D.C., 496-504.

Sony Computer Entertainment America, Inc. 2003. Playstation. com—Games—EyeToyTM Website (htta;__.(w ww.us.glalyst~tion. 4t~mi mes as ~s_'id,_SC,~.97319).

UDLP. 2003. United Defense, L.P. Viewgraph package presented at Boeing Missouri Supplier's Conference, Nov. 17, 2003 (http://www.boeing.com/defense-space/ic/fcs/bia/03 1202_mo_briefings/031202_ud.pdf), pp. 7.

Delaney, K. J. 2003. Sony Plans to Sell EyeToy in U.S. After Strong Launch. The Wall Street Journal, Aug. 28, 2003.

Pausch, R., Crea, T., Conway, M. 1992. A Literature Survey for Virtual Environments: Military Flight Simulator Visual Systems and Simulator Sickness. Presence 1, 3, 344-363.

$$M_1 = \begin{bmatrix} 1 & 0 & 0 & trackballX + headX \\ 0 & 1 & 0 & trackballY + headY \\ 0 & 0 & 1 & trackballZ + headZ \\ 0 & 0 & 0 & 1 \end{bmatrix}$$

SYSTEM AND METHOD FOR OPERATING IN A VIRTUAL ENVIRONMENT

CROSS-REFERENCE TO RELATED APPLICATIONS

The present application claims the benefit of priority of U.S. Provisional Patent Application No. 60/550,808, filed Mar. 5, 2004, and entitled "Method and Apparatus for Interacting with a Virtual Environment."

REFERENCE TO COMPUTER PROGRAM LISTING APPENDIX

The following is a listing of the files found on the enclosed compact disc, two copies of which are submitted. The contents of the enclosed compact disc are herein incorporated by reference to this application. The enclosed discs labeled "Copy 1" and "Copy 2" are identical.

BACKGROUND OF THE INVENTION (1) Field of the Invention

The present invention relates to a system, method and computer program product operating in a virtual environment (VE). More specifically, the present invention relates to calculating a non-linear mapping of a relative position of a real-actuator and a real-viewpoint in a real-world environment to a relative position to a virtual-actuator and the virtual-viewpoint in the virtual environment based on a calculated scale-factor. Further, the present invention relates to changing a view orientation in a virtual environment independent of the physical orientation of a user input. Additionally, the present invention relates to allowing a user to select individual or multiple objects in a virtual environment by accepting input from a three-dimensional input device, constraining the input to two degrees of freedom, and applying constrained, two-dimensional selection techniques to three-dimensional environments.

(2) Description of Related Art

Many virtual environment interfaces track the user physical hand movement to control the placement of an actuator, i.e., cursor. In fully immersed virtual environments (VEs), the head and, often, some limbs of the participant immersed in the VE, are spatially tracked with six degrees of freedom. The six degrees of freedom are the X, Y, and Z coordinates of the position of the tracked body part (for example the head and a hand), and the heading, pitch, and roll of the tracked body part. The known position of the real-viewpoint, i.e., the head, is used to adjust a virtual-viewpoint of the VE in the virtual world, such that turning the head to the left in the real-world environment results in the virtual-viewpoint rotation to the left in the VE. The known position of the hand in the real-world environment is used to render a virtual hand at the respective position in the VE. Thus, extending the hand one meter out from the head in the real-world results in an apparent distance of one meter of the virtual hand from the virtual-viewpoint in the VE. Therefore, in these systems, the user's reach in the VE is constrained to the physical reach of the hand in the real-world.

Some attempts have been made to overcome this limitation. The proposed solutions extend the user's reach in various ways but do not guarantee that the user will actually be able to reach any particular object of interest.

When interaction with a VE from various distances is desired, the physical reaching distance of the hand becomes an unfeasible restriction on the reaching distance in the VE. For example, when the virtual environment is an actual landscape and the participant can virtually "fly above" the terrain, then he would not be able to reach to the ground if the participant's altitude was higher than about one meter. What is needed is a system and method that scales the distance of the head, i.e., viewpoint, to the hand, i.e., actuator, such that the user is always able to manipulate objects within the VE regardless of the distance.

Additionally, traditional immersive navigation tracks a participant in six degrees of freedom, giving the feeling that the participant is immersed in the VE. Immersive navigation is natural as the user physically looks and moves around the room to transverse the VE. However, movement is limited physically by equipment, space, and body posture. Situations that require a participant to look up or down for long periods result in fatigue and neck strain.

One method of allowing a user to interact with a VE is called trackball navigation. Trackball navigation allows a participant to orbit an object or point of interest to study it from multiple vantage points and distances. Trackball navigation is constrained, making it easy to control, but not well-suited to immersive environments. For instance, head-tracking data, which is one aspect of an immersive environment, alone does not naturally map to control of trackball parameters.

Trackball navigation can be described by envisioning a sphere centered on the trackball center. The viewpoint is generally located on the surface of the sphere, and if the participant is facing into the neutral direction in the physical world (i.e., straight ahead when seated in a fixed chair), the viewpoint is always directed towards the center of the sphere, i.e., the trackball center.

In trackball navigation, there are two operational viewpoint controls. First, the participant can move around on the surface of the sphere. The participant can rotate along the surface in a vertical plane (up and down), thus gaining a viewpoint more above or below the trackball center. In addition, the participant can move along the surface in a horizontal plane, thus rotating around the trackball center and looking at it from east, northeast, north, etc. When rotating in the horizontal plane, the viewpoint direction may be changed accordingly (west, south west, south, etc.) Second, the participant can change the radius of the sphere, which results in apparent zooming in toward and out from the trackball center.

Advantages of trackball navigation are that it closely resembles eye and hand movements of humans during manipulation of objects on a sandbox simulation. By having a multi-directional viewpoint control, the participant is able to study a point or object of interest from multiple angles quickly and easily.

Another method of allowing a user to interact with the VE is called grab navigation. Grab navigation increases the perceived range of motion for the participant. Instead of moving only in the relatively small tracked area of the physical environment, the participant is free to travel great distances with a move of the hand. One drawback is that grab navigation alone does not offer any control over the view orientation.

Using grab navigation, the participant navigates within the virtual environment by grabbing the virtual world and making a grab-gesture with his hand. As long as he maintains this gesture, the position in the virtual world where he grabbed is locked into the position of the hand. Therefore, when physically moving the hand to the right, the participant translates to the left in the virtual world. An analogy in the 2-dimensional user interface is the "grab document" action in Adobe Reader®. When a participant grabs the world and then lowers his hand, the apparent effect is that the world sinks away with the hand, or alternatively, the participant rises above the world.

Additionally, what is needed is a system, method, and computer product which allows for immersive navigation without the draw-backs of fatigue and strain to the user, and also allows for navigation in constrained environments.

In a virtual environment, a user typically indicates a single point or object of interest by making a static pointing gesture with the user's hand. Alternatively, the user indicates multiple objects of interest by sweeping the pointing gesture across the field of view. Most interfaces do not use head orientation to directly control selection. In current virtual environments, head movement is mapped to steering a fly-through of a virtual environment. Also, head-tracking data is often used to control the immediate viewpoint. However, if head orientation data could be incorporated directly into the computation of user selections, it would make it possible for a user to make selections with the user's head, or in combination with another body part.

Other interfaces for virtual environments are based on direct manipulation. However, direct manipulation is not always feasible for situations that require a user to interact with distant objects or numerous objects simultaneously. Furthermore, a familiar two-dimensional input device, like a mouse, is not usually available in a virtual environment.

Selection and pointing are often difficult in a virtual environment. Errors in the tracking data, use of a navigation metaphor in combination with immersive head tracking, and selection over long distances are several factors that make selection and pointing difficult.

A small error in tracking data, or small jitters in either the tracking equipment or the user's hand, are greatly magnified when a selection is made over a very long distance. Furthermore, the error increases proportionately as the distance increases.

In traditional virtual environments, a ray is cast from the user's finger for use as a pointer. This method requires extremely high accuracy in all measurements of joint angles or positions. A ray projected over a long distance will greatly magnify any error in such measurements, making it very impractical for applications with large-scale virtual environments. In some instances, errors and anomalous values in tracking data can be mitigated with smoothing functions or filters. However, this technique only works for errors due to poor tracking data. Errors caused by physiological and environmental constraints must be handled differently. For example, if the user unintentionally moves his hand by one degree, the movement error at a distance of 10 meters would be about 0.175 meters. However, if the distance is increased to 10 kilometers, the error is approximately 175 meters. Natural muscle movement can thus make selection using the ray casting approach very difficult.

Therefore, a need exists in the art for a method of selecting and pointing in a virtual environment with ease of use and great accuracy over long distances.

SUMMARY OF THE INVENTION

The present invention provides a system and a method that overcomes the aforementioned limitations and fills the aforementioned needs by utilizing environmental conditions to effectively lengthen the user's reach in a virtual environment.

In one aspect of the invention, a method of interacting with a virtual environment is provided, the method comprising acts of calculating a xy-scale factor based on a vertical distance from a virtual-viewpoint to a reference point in the virtual environment; and calculating a non-linear mapping of a relative position of a real-actuator and a real-viewpoint in a real-world environment to a relative position of a virtual-actuator and the virtual-viewpoint in the virtual environment based on the xy-scale-factor.

In another aspect of the invention, a method of manipulating objects in a virtual environment is provided, the method comprising acts of calculating a xy-scale-factor based on a vertical distance from a virtual-viewpoint to a reference point in the virtual environment; calculating a z-scale-factor based on a vertical distance from a virtual-actuator to the reference point in the virtual environment; and calculating a non-linear mapping of a relative position of a real-actuator and a real-viewpoint in a real-world environment to a relative position of the virtual-actuator and the virtual-viewpoint in the virtual environment based on the xy-scale-factor.

In another aspect of the present invention, the reference point is a virtual-ground plane.

In a further aspect of the present invention, the system for scaling dimensions within a virtual environment comprises: a graphics subsystem for receiving input from a virtual environment processing subsystem and a real-world environment tracking subsystem, where the virtual environment processing subsystem provides a virtual-viewpoint position and a virtual actuator position, and the real-world environment tracking subsystem provides a real-viewpoint position and a real-actuator position, the graphics subsystem comprising: a xy-scale factor module for receiving the virtual-viewpoint position and generating and outputting a xy-scale-factor based on the virtual-viewpoint position; and a non-linear mapping module for receiving the virtual-viewpoint position, the virtual-actuator position, the real-viewpoint position, the real-actuator position, and the xy-scale-factor and generating a non-linear mapping between a real dataset comprising: the real-actuator position and the real-viewpoint position in the real-world environment and a virtual dataset comprising: the virtual-actuator position and the virtual-viewpoint position in the virtual environment, wherein the non-linear mapping is based on the xy-scale-factor.

In a yet further aspect of the present invention, the system for enabling user interaction with objects in a virtual environment comprises: a graphics subsystem for receiving input from a virtual environment processing subsystem and a real-world environment tracking subsystem, where the virtual environment processing subsystem provides a virtual-viewpoint position and a virtual actuator position, and the real-world environment tracking subsystem provides a real-viewpoint position and a real-actuator position, the graphics subsystem comprising: a xy-scale factor module for receiving the virtual-viewpoint position and outputting a xy-scale-factor based on the virtual-viewpoint position; a z-scale factor module for receiving the virtual-actuator position and outputting a z-scale-factor based on the virtual-actuator position; and a non-linear mapping module for receiving the virtual-viewpoint position, the virtual-actuator position, the real-viewpoint position, the real-actuator position, and the xy-scale-factor and generating a non-linear mapping between a real dataset comprising: the real-actuator position and the real-viewpoint position in the real-world environment and a virtual dataset comprising: the virtual-actuator position and the virtual-viewpoint position in the virtual environment, wherein the non-linear mapping is based on the xy-scale-factor and the z-scale-factor.

In still another aspect of the present invention, a computer program product for scaling dimensions within a virtual environment comprises computer readable instructions on a computer-readable medium for causing a computer system to perform operations of: calculating a xy-scale-factor based on a vertical distance from a virtual-viewpoint to a reference point in the virtual environment; and calculating a non-linear mapping of a relative position of a real-actuator and a real-viewpoint in a real-world environment to a relative position of a virtual-actuator and the virtual-viewpoint in the virtual environment based on the xy-scale-factor.

In a further aspect of the invention, a computer program product for manipulating objects in a virtual environment comprises computer readable instructions on a computer-readable medium for causing a computer system to perform operations of: calculating a xy-scale-factor based on a vertical distance from a virtual-viewpoint to a reference point in the virtual environment; calculating a z-scale-factor based on a vertical distance from a virtual-actuator to the reference point in the virtual environment; and calculating a non-linear mapping of a relative position of a real-actuator and a real-viewpoint in a real-world environment to a relative position of the virtual-actuator and the virtual-viewpoint in the virtual environment based on the z-scale factor and the xy-scale-factor.

Another aspect of the present invention is a method of navigating in a virtual environment, the method comprising acts of locating a point of interest at a center of an reference sphere based on a first set of data inputs from a second sensor set; selecting a radius of the reference sphere; calculating a position of an intermediate virtual-viewpoint on the reference sphere, wherein the radius of the reference sphere and the location of the intermediate virtual-viewpoint are based on a second set of data inputs from the second sensor set; determining a gaze direction from the intermediate virtual-viewpoint to the point of interest; and receiving a third set of data inputs from a first sensor set, wherein the third set of data inputs correlates to a new point of interest, wherein the second sensor set and the first sensor set are different sensor sets.

Still another aspect of the present invention is the method of navigating in a virtual environment, further comprising the acts of changing the center of the reference sphere such that the new point of interest is located at the center of the reference sphere.

Yet another aspect of the present invention is a graphics processing system for determining a virtual-viewpoint a virtual environment, the system comprising: an input for receiving data from a tracking subsystem having a first sensor set, a second sensor set and a third sensor set, wherein the second sensor set and the third sensor set are different sensor sets; a graphics processor for receiving data from the first sensor set, the second sensor set and the third sensor set, the graphics processor including processing modules for determining: a point of interest based on the data from the first sensor set; a position and orientation of an intermediate virtual-viewpoint with respect to the point of interest based on data from the second sensor set; and a position and orientation of a final virtual-viewpoint based on the position and orientation of the intermediate virtual-viewpoint and the data from the third sensor set; and an output for outputting the position and orientation of the final virtual-viewpoint to a graphics rendering engine to generate a virtual display to be displayed on a display device, whereby a user may view the virtual environment from the final virtual-viewpoint.

Still another aspect of the present invention is a graphics processing system for determining a virtual-viewpoint in a virtual environment, wherein the graphics subsystem changes the point of interest based on data from the first sensor set.

A further aspect of the present invention is a system for navigating in a virtual environment, the system comprising a data processing system having computer-readable instructions therein for causing the data processing to perform operations of: receiving data from a tracking subsystem having a first sensor set, a second sensor set and a third sensor set, wherein the second sensor set and the third sensor set are different sensor sets; locating a point of interest at a center of an reference sphere based on a first set of data inputs from a first sensor set; selecting a radius of the reference sphere; computing a position of an intermediate virtual-viewpoint on the reference sphere, wherein the radius of the reference sphere and the location of the intermediate virtual-viewpoint are based on a second set of data inputs for a second sensor set; determining a gaze direction from the intermediate virtual-viewpoint to the point of interest; and defining a final virtual-viewpoint by adjusting the location and gaze direction of the intermediate virtual-viewpoint based on a third set of data inputs from a third sensor set, and providing the final virtual viewpoint to a rendering engine to generate a virtual display to be displayed on a display device.

Yet a further aspect of the present invention is a computer program product for navigating in a virtual environment, the computer program product comprising computer readable instructions on a computer-readable medium for causing a computer system to perform operations of: locating a point of interest at a center of an reference sphere based on a first set of data inputs from a first sensor set; selecting a radius of the reference sphere; calculating a position of an intermediate virtual-viewpoint on the reference sphere, wherein the radius of the reference sphere and the location of the intermediate virtual-viewpoint are based on a second set of data inputs for a second sensor set; determining a gaze direction from the intermediate virtual-viewpoint to the point of interest; and defining a final virtual-viewpoint by adjusting the location and gaze direction of the intermediate virtual-viewpoint based on a third set of data inputs from a third sensor set, wherein the second sensor set and the third sensor set are different sensor sets.

Still a further aspect of the present invention is a computer program product, wherein the computer readable instructions on the computer-readable medium further causes the computer system to perform operations of: receiving a fourth set of data inputs from the first sensor set, wherein the fourth set of data inputs correlates to a new point of interest; and changing the center of the reference sphere such that the new point of interest is located at the center of the reference sphere.

Another aspect of the present invention is a system for selection and pointing in a virtual environment, comprising an input module for receiving speech inputs and tracking orientation data from a first body part and a second body part; a cursor-processing module connected with the input module for computing the position of a cursor in a virtual environment, wherein the cursor position is determined from the orientation data of the first and second body parts; a selection-processing module connected with the input module and the cursor-processing module for computing the intersection of a ray cast from a user's viewpoint through the cursor with the objects and terrain in the virtual environment; and a display connected with the cursor-processing module and the selection-processing module to graphically illustrate the results of the intersection to the user.

A yet further aspect of the present invention is a method for selecting and pointing in a virtual environment, the method comprising acts of receiving speech inputs and tracking orientation data from a first body part and a second body part; computing the position of a cursor in a virtual environment from the orientation data of the first body part and second body part; computing the intersection of a ray cast from a user's viewpoint through the cursor with objects and terrain in a virtual environment; selecting objects in the virtual environment that intersect the ray; and graphically illustrating the results of the intersection to the user.

A further aspect of the present invention is a computer program product for selection and pointing in a virtual environment, the computer program product comprising computer readable instructions on a computer-readable medium for causing a computer system to perform operations of receiving speech inputs and tracking orientation data from a first body part and a second body part; computing the position of a cursor in a virtual environment from the orientation data of the first body part and second body part; computing the intersection of a ray cast from a user's viewpoint through the cursor with objects and terrain in a virtual environment; selecting objects in the virtual environment that intersect the ray; and graphically illustrating the results of the intersection to the user.

BRIEF DESCRIPTION OF THE DRAWINGS

The objects, features and advantages of the present invention will be apparent from the following detailed descriptions of the various aspects of the invention in conjunction with reference to the following drawings.

DETAILED DESCRIPTION

Figure 1:
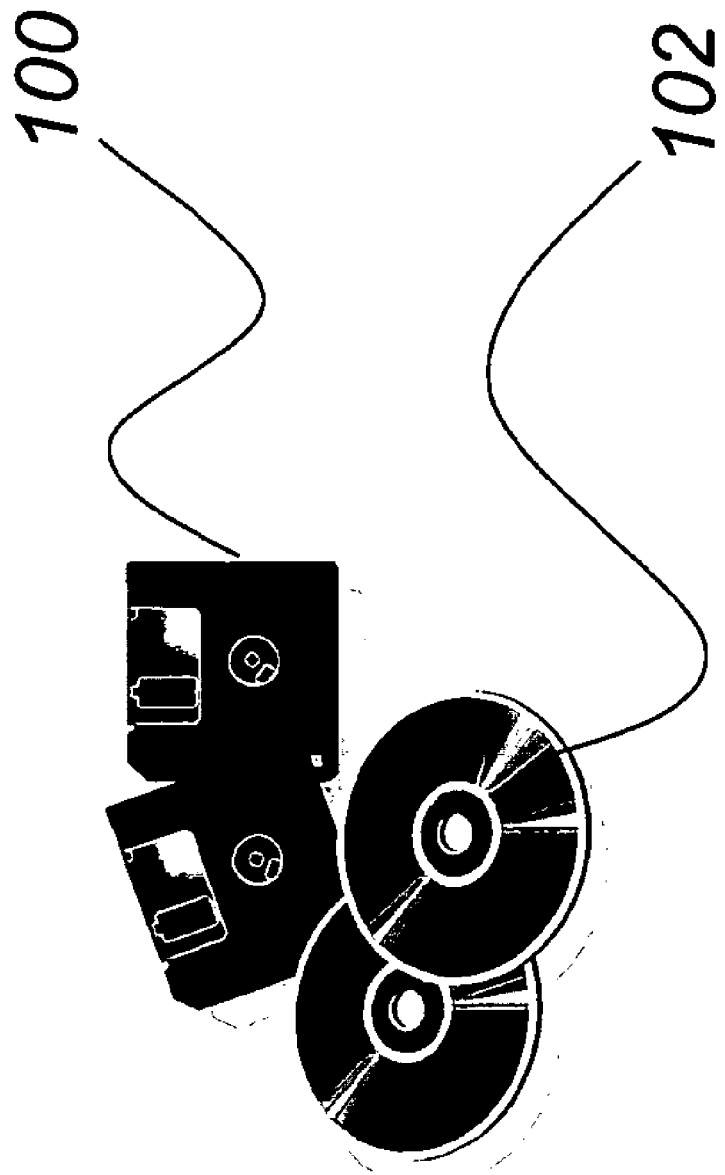
FIG. 1 is an illustrative diagram of a computer program product aspect of the present invention.

The present invention relates to interacting with a virtual environment. More specifically, the present invention relates to calculating a non-linear mapping of a relative position of a real-actuator and a real-viewpoint in a real-world environment to a relative position to a virtual-actuator and the virtual-viewpoint in the virtual environment based on a calculated scale-factor. In addition, the present invention relates to immersive navigation in a virtual environment. More specifically, the present invention relates to changing a view orientation in a virtual environment independent of the physical orientation of a user input.

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

(1) Introduction

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Some portions of the detailed description are presented in terms of a sequence of events and symbolic representations of operations on data bits within an electronic memory. These sequential descriptions and representations are the means used by artisans to most effectively convey the substance of their work to other artisans. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as bits, pixels, values, elements, files, and coefficients.

It is to be understood, that all these, and similar terms, are to be associated with the appropriate physical quantities and are merely convenient labels applied to these quantities. Unless specifically stated otherwise, as apparent from the following discussions, it is appreciated that throughout the present disclosure, discussions utilizing terms such as "processing," "calculating," "extracting," "determining," "inputting," "modeling," "obtaining," "outputting," or "displaying" refer to the action and processes of a computer system, or similar electronic device that manipulates and transforms data represented as physical (electronic) quantities within the system's registers and memories into other data similarly represented as physical quantities within the computer system memories or registers or other such information storage, transmission, or display devices. Furthermore, the processes presented herein are not inherently related to any particular processor, processor component, computer, software, or other apparatus.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

The operations performed by the present invention may be encoded as a computer program product. The computer program product generally represents computer-readable code stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read only memory (ROM), and flash-type memories. An illustrative diagram of a computer program product embodying the present invention is depicted in FIG. 1. The computer program product is depicted as a magnetic disk 100 or an optical disk 102 such as a CD or DVD. However, as mentioned previously, the computer program product generally represents computer-readable code stored on any desirable computer readable medium.

(2) System Overview—Non-limiting Mapping

The description outlined below sets forth a system and method for scaling and positioning objects in a virtual environment. The disclosed system and method enables a user to interact with the modeled world in the virtual environment in a natural way, using the constraints imposed by the physical world to effectively translate real user actions into spatially-adjusted actions in the virtual environment.

The disclosed system and method utilizes a technique that scales the distance in a virtual environment of a viewpoint (i.e., a user's head) to an actuator (i.e., a user's hand) according to a selected number of parameters dictated by the current configuration of the virtual environment. Examples of parameters that may be used are altitude, a relative distance of the actuator from the viewpoint, a threshold for when the system starts scaling, and a navigation metaphor. One goal that the current system and method achieves is allowing a user to always be able to manipulate objects in the virtual environment, independent of the distance between the viewpoint and the object in the virtual environment. For example, the disclosed system and method allows a user to manipulate objects on the ground within the virtual environment independent of the apparent viewpoint altitude by dynamically extending the reach of the actuator to the ground in the virtual environment. The apparent effect of the disclosed system and method is equivalent to scaling the virtual environment, but not the participant, so that interaction is possible with both the real-sized virtual environment and the sandbox-sized virtual environment.

The disclosed system and method takes into account environmental conditions and user intentions to dynamically adjust the user's reach. User interaction, particularly direct manipulation, is possible simultaneously at varying scales from microscopic to macroscopic over large and small distances. Effectively, the user's reach within the virtual environment is extended beyond a distance that the user would be able to reach in the physical world.

While the following description is written with reference to a user's head as the viewpoint and a user's hand as the actuator, one skilled in the art will appreciate that there are many different types of virtual environments. In some virtual environments, different instruments or actuators are used to manipulate objects in the environment, such as a joystick. Thus, this disclosure is not intended to be limited to the body parts of a user, but extend to any method of controlling a viewpoint and an actuator within a virtual environment.

(3) System Details—Non-linear Mapping

One technique that has been developed to effectively lengthen a user's reach in a virtual environment is the Go-Go technique developed by Poupyrev et al., "The Go-Go Interaction Technique: Non-Linear Mapping for Direct Manipulation in VR," ACM Symposium on User Interface Software and Technology, 1996, pp. 79-80. The technique of Poupyrev et al. statistically scales the reaching distance of the hand with a quadratic function. The disclosed system and method concerns the dynamic adjustment of the scaling parameters included in this function. Two different sets of parameters are used, one set for scaling in the horizontal (xy) plane, and another set for scaling in the vertical (z) plane.

In the xy-plane of one embodiment, the measure for the adjustment is a distance from the participant's head (viewpoint) to the ground in the virtual world. These parameters are chosen such that with a fully extended arm, the participant can reach twice as far as the distance from head to ground. Assumptions are made for the average arm length; however, these assumptions do not affect the performance of the technique. Once the parameters are determined, the hand is translated according to the Go-Go function.

While the prior art uses a fixed relation between the Go-Go parameters for the xy translation and the parameters for the z translation, in the disclosed system and method the parameters for the Go-Go translation are independently adjusted in the vertical direction after the translation in the horizontal plane is completed. Based on the distance and of the hand at the new location to the ground, the Go-Go parameters are chosen such that the participant is always well able to reach the ground.

The location of the hand in the virtual world is also offset such that it is within the view of the head-mounted display (HMD). Due to the restricted field of view of current HMDs, the hand is usually too low to be in view. Raising the hand up physically can quickly cause fatigue. The offset alleviates this problem.

Figure 2:
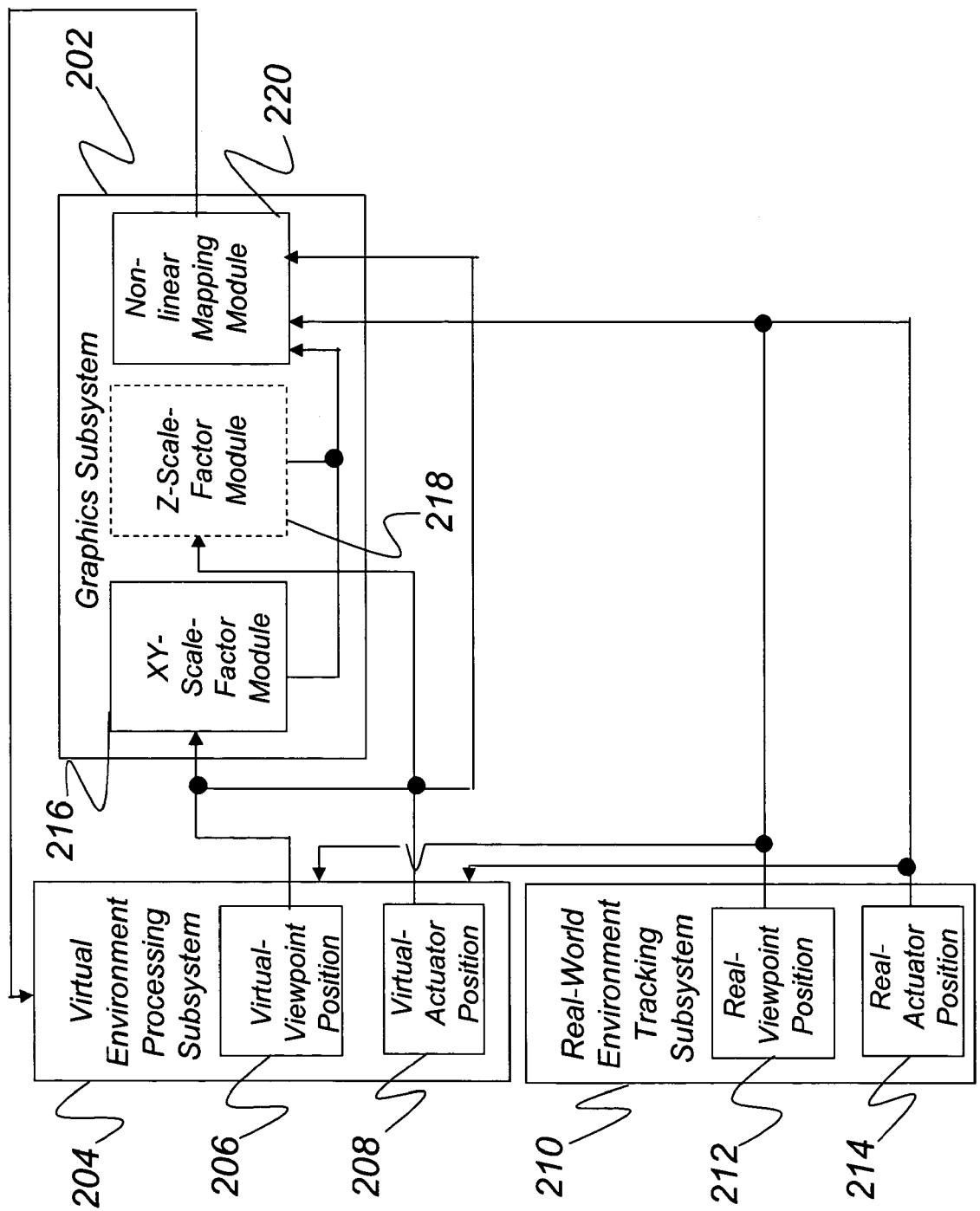
FIG. 2 is flow diagram of one embodiment of the present invention.

FIG. 2 depicts a block diagram of a system in accordance with the present invention. In one aspect of the present invention, a real-world environment tracking subsystem 210 is utilized to monitor, store and report a real-viewpoint position 212 and a real-actuator position 214. One skilled in the art will appreciate that there are many methods of determining real-world position. For example, sensors may be placed on a user's head and hands, wherein a first sensor is a reference point and the other sensors' position is reported relative to the first sensor.

In order to provide the virtual environment, the real-world environment tracking subsystem 210 is connected with a virtual environment processing subsystem 204. The virtual environment processing subsystem 204 receives the real-viewpoint position 212 and the real-actuator position 214 and stores and reports a virtual-viewpoint position 206 and a virtual-actuator position 208 to a graphics subsystem 202. In most virtual environments the mapping between the real-world positions to the virtual-world positions requires a translation from the real-world coordinates to the virtual-world coordinates, but relative distances between objects in the physical world and objects in the virtual world, i.e., relative distances between the head and hands of the user, remains the same in the virtual environment as it is in the real-world environment.

As shown in FIG. 2, the graphics subsystem 202 comprises a xy-scale-factor module 216 which receives the virtual-viewpoint position 206 from the virtual environment processing subsystem 204. The xy-scale-factor module 216 then calculates a xy-scale-factor based upon the virtual-viewpoint position. In one embodiment, the xy-scale-factor is calculated by first determining the altitude, i.e. vertical distance, of the virtual view-point position 106 to a reference point, i.e. the ground plane in the virtual environment. Next, a max reach distance is set to be twice the vertical distance. Essentially, this allows the virtual-actuator to travel in the xy-plane a distance twice as far as the distance from the virtual-viewpoint to the virtual ground plane in the virtual environment. One skilled in the art will appreciate that any number not equal to one will provide a scaling factor between the relative distance of the real-viewpoint and real-actuator in the real-world environment to the relative distance of the virtual-viewpoint and the virtual-actuator in the virtual environment.

In order to allow a user to manipulate virtual-objects any distance from the virtual-viewpoint, optionally a threshold is set such that the scaling of the relative distance of the real-viewpoint and real-actuator in the real-world environment to the relative distance of the virtual-viewpoint and the virtual-actuator in the virtual environment is preformed when the distance from the virtual-viewpoint to the virtual ground plane is greater than the distance from the real-viewpoint to the real-actuator. One skilled in the art will appreciate that this threshold was chosen simply to ensure that the user is always able to touch the ground in the virtual environment, and any threshold or no threshold may be chosen.

The xy-scale-factor is calculated by the following equation:

$$xy-scale-factor = \frac{maxReachDistance - armLength}{armlength^2},$$

where maxReachDistance is the twice the vertical distance as described above, and armLength is the maximum distance the real-viewpoint and the real-actuator may be from each other. In one embodiment, where the real-viewpoint is the user's head and the real-actuator is the user's hand, armLength is the distance between the user's head and the user's arm when the user has fully extended his arm.

The xy-scale-factor is then outputted from the xy-scale-factor module 216 to the non-linear mapping module 220. The non-linear mapping module 220 then utilizes the xy-scale-factor to determine the non-linear mapping between the relative distance of the real-viewpoint and real-actuator in the real-world environment to the relative distance of the virtual-viewpoint and the virtual-actuator in the virtual environment.

In one embodiment the non-linear mapping is accomplished by the following computer code written in the C language.

/* distance head to hand in OpenGL coords, in xy plane */
    dxRightHand=hmdPointer->rightHand.x−hmdPointer->headPosition[0];

dxRightHand=hmdPointer->rightHand.y−hmdPointer->headPosition[1];
    xyDistance=sqrt(dxRightHand*dxRighthand+dyRightHand*dyRightHand)+1.0;
/* apply gogo in horizontal plane */
    if (xyDistance>xyThreshold) {
        scaleDistance=xyDistance+xy-scale-factor*(xyDistance)*(xyDistance);
        dxRightHand=(dxRightHand/xyDistance)*scaleDistance;
        dyRightHand=(dyRightHand/xyDistance)*scaleDistance;
    }

After the non-linear mapping module 220 determines the coordinates for the virtual-actuator based upon the calculated scale distance, which is based on xy-scale-factor, the coordinates for the virtual-actuator are sent to the virtual environment processing subsystem 204 an a new virtual-actuator position 108 is stored.

In addition to utilizing the xy-scale-factor, the non-linear mapping module 220 may also receive a z-scale-factor from an optional z-scale-factor module 218. The z-scale-factor allows for a non-linear translation of the z-position of the virtual-actuator. After the xy-scale-factor is computed, an optional z-scale-factor may be computed based upon the distance the virtual-actuator is above the virtual-ground in the virtual environment after the xy-scale factor has been applied to the virtual-actuator position. The z-scale-factor ensures that the user is always able to reach the ground.

In one embodiment the z-scale-factor is computed using the following set of instructions set forth in the portion of C code below:

```
/* re-compute the ground distance from where the hand got
        translated to with the xy gogo technique */
    /* zGogoFactor (the scaling factor) is dependent on
hand altitude*/
        groundDistanceGogoHand =
            (hmdPointer->rightHand.z -
groundElevationGogoHand);
            if (groundDistanceGogoHand < 0.0) {
                groundDistanceGogoHand = 0.0;
            }
            /* tmp for computation of zGogoFactor */
            sqrZ =
                (armLength - zGogoThreshold) * (armLength -
zGogoThreshold);
            if (sqrZ == 0.0 || groundDistanceGogoHand <
armLength) {
                zGogoFactor = 0;
            } else {
                zGogoFactor = (groundDistanceGogoHand -
armLength) / sqrZ;
                if (zGogoFactor > zGogoFactorMax) {
                    zGogoFactor = zGogoFactorMax;
                }
            }
            zGogoFactorStored = zGogoFactor;
```

Figure 3:
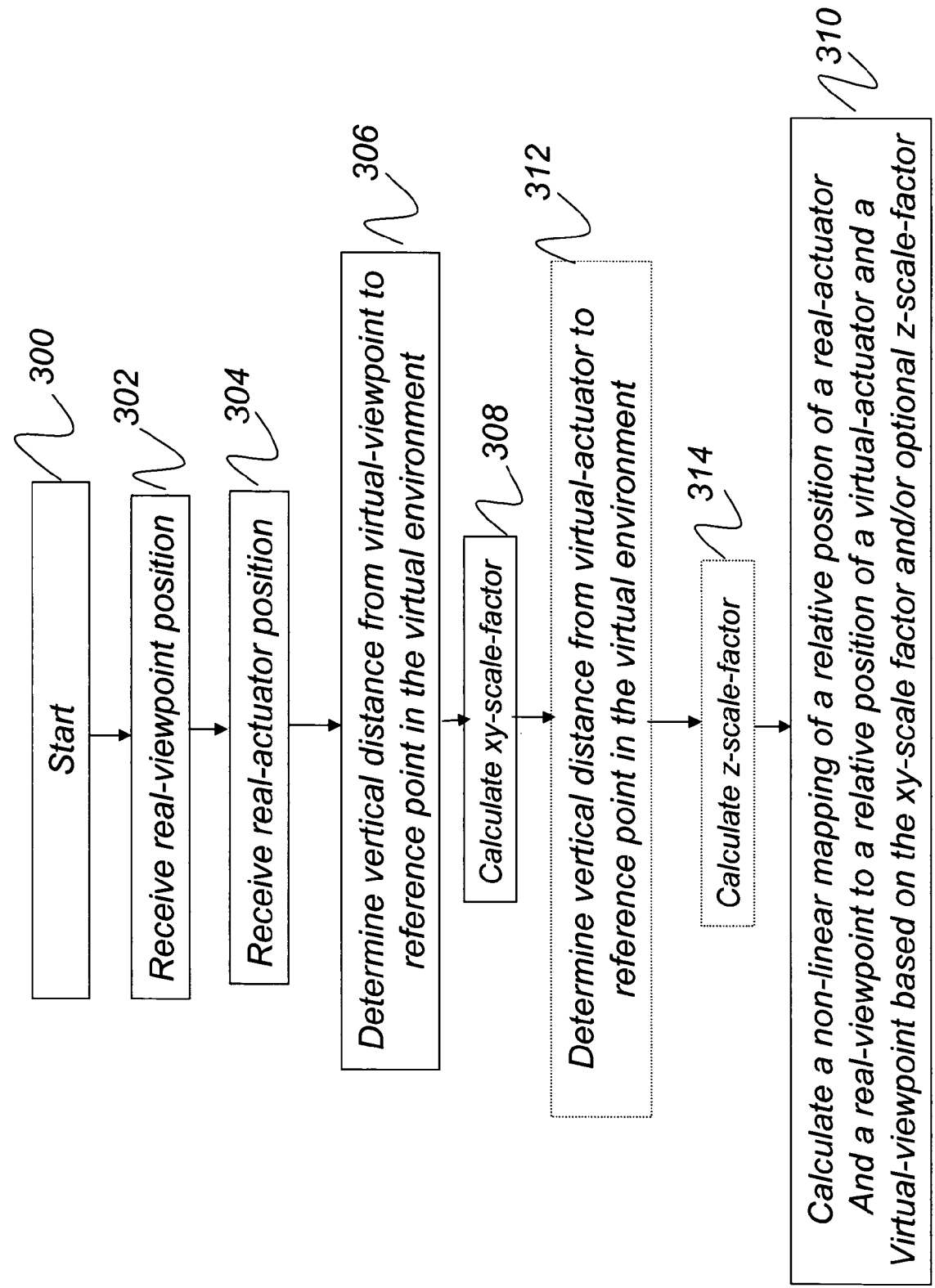
FIG. 3 is a block diagram of a virtual rendering environment in accordance with the present invention.

FIG. 3 depicts a flow-digram of one embodiment of the present invention. After starting 300, an act of receiving a real-viewpoint position 302 is performed. Next, an act of receiving a real-actuator position 304 is performed. One skilled in the art will appreciate that the acts of receiving a real-viewpoint position 302 and a real-actuator position 304 may be interchanged.

Next, an act of determining a vertical distance from the virtual-viewpoint to a reference point in the virtual environment 306 is performed. Based on the vertical distance, the act of calculate xy-scale-factor 308 is performed.

Finally, an act of non-linearly mapping a relative position of a real-actuator and a real-viewpoint to a relative position of a virtual-actuator and a virtual-viewpoint based on the xy-scale factor 310 is performed.

Optionally, an act determining a vertical distance from the virtual-actuator to the reference point 312 is preformed. This is followed by an act of calculating a z-scale-factor based upon the vertical distance. Finally, an act of non-linearly mapping a relative position of a real-actuator and a real-viewpoint to a relative position of a virtual-actuator and a virtual-viewpoint based on the xy-scale factor, and the z-scale-factor 310 is performed.

In another possible embodiment, the hand gravitates toward the objects of interest. For example, if the user wanted only to interact with vehicles in the virtual environment, the system would have the virtual hand pulled towards the vehicle objects. One skilled in the art will appreciate that this could apply to any environmental variable that the user wants to set.

Another example would be mapping information density to the environment, yielding a non-linear map. The hand would change behavior in different density areas of the map. For example, a section with a large amount of information in a small area would require finer-grained control of the hand than an area with less densely packed objects.

(4) System Overview—Immersive Navigation

The description outlined below sets forth a system and method which may be used for immersive navigation in a virtual environment. The disclosed system and method enables a user to change a view orientation in a VE, independent of the physical orientation of the user input.

Figure 4:
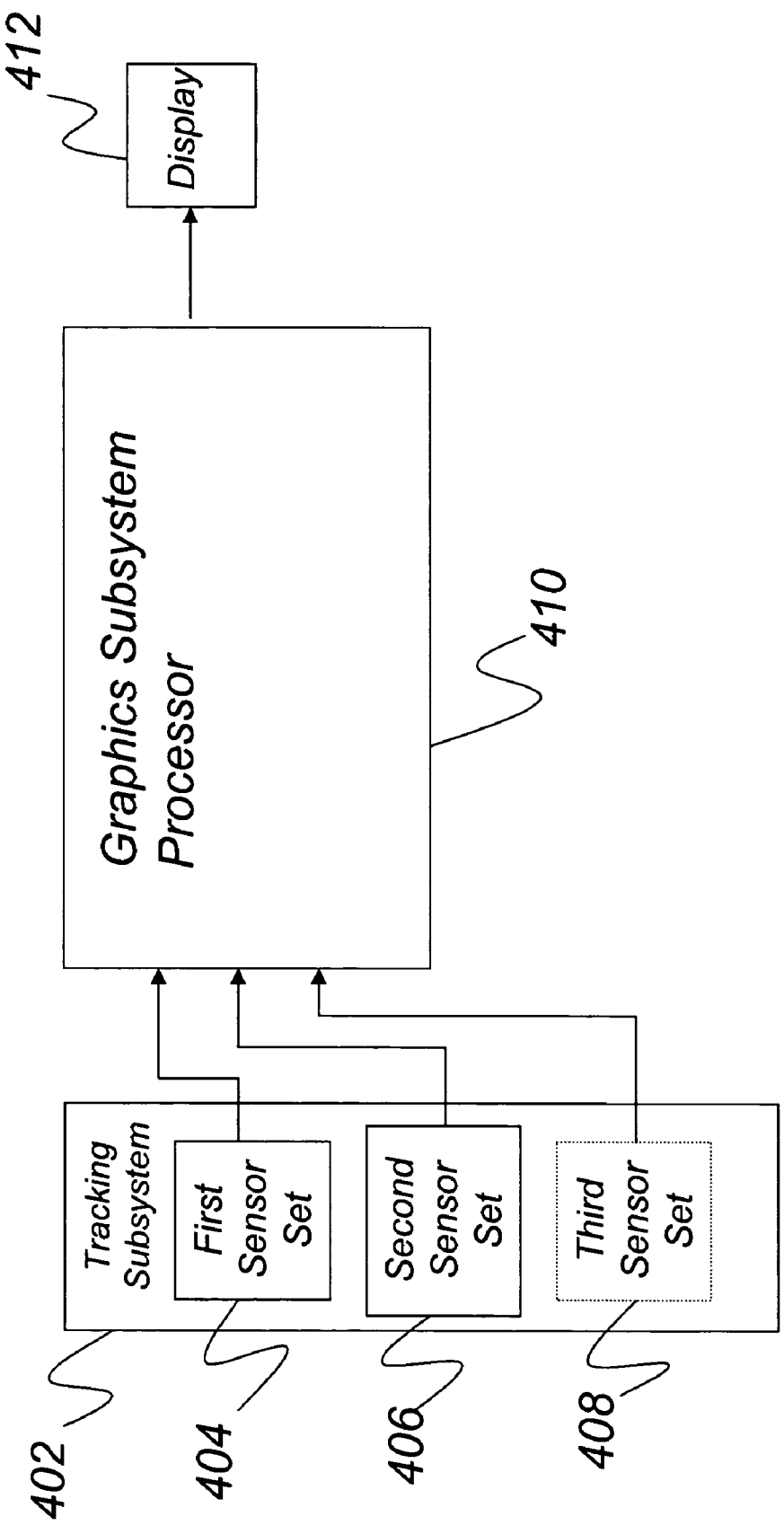
FIG. 4 is block diagram of one embodiment of the present invention.

A block diagram depicting the components of a computer system that may be used in conjunction with the present invention is provided in FIG. 4. The computer system comprises a tracking subsystem 402, a graphics subsystem processor 410 and a display 412.

The tracking subsystem 402 comprises a first sensor set 404, a second sensor set 406 and an optional third sensor set 408. Non-limiting examples of sensor sets 404, 406 and 408 include any combination of sophisticated trackers, a keyboard, a mouse, or speech. In one embodiment, the second sensor set 406 and the third sensor set 408 includes sensors placed on a user's hand, while the first sensor set 404 includes sensors placed on a user's head. In one embodiment, the participant is immersed in the VE, thus the first sensor set 404 can be either a head-mounted display or Cave Automatic Virtual Environment (CAVE) with supporting 3D rendering software and hardware.

Data from the first sensor set 404 allows a user to locate a point of interest at a center of a reference sphere. Data from the second sensor set 406 allows the user to select a radius of the reference sphere. This reference sphere is used in what is commonly referred to as trackball navigation. The data from the second sensor set 406 allows for the computation of a location of an intermediate virtual-viewpoint on the reference sphere. Essentially, the data from the second sensor set 406 allows for the determination of the heading, pitch, and radius for trackball navigation. In one embodiment, gesture recognition is used in combination with the second sensor set 406 to determine the heading, pitch and radius for trackball navigation. A gaze direction, from the first sensor set 404, is determined along a ray starting at the intermediate virtual-viewpoint and ending at the point of interest.

Data from the optional third sensor set 408 allows the user to define the final virtual-viewpoint by adjusting the location and gaze direction of the intermediate virtual viewpoint. The optional third sensor set 408 maybe a separate set of sensors from the second sensor set 406. In one embodiment, the second sensor set 406 is positioned on a user's wrists while the optional third sensor set 408 is positioned on a user's fingers. One skilled in the art will appreciate that the two different sensor sets, the second sensor set 406 and the optional third sensor set 408, are not limited to the user's hands.

One skilled in the art will appreciate that the first sensor set 404, the second sensor set 406, and the optional third sensor set 408 constantly feed inputs into the graphics subsystem processor 410 by which the final virtual-viewpoint is adjusted. For example, additional data from the first sensor set 404 can reposition the center of the reference sphere.

The final virtual-viewpoint is sent from the Graphics Subsystem Processor 410 to the display 412 for display to the user.

As described above, trackball navigation and grabbing are commonly used in navigating virtual environments; however, to combine these two techniques and enable them to be used in an immersive environment, new semantics are needed. Thus, a grab-move translation in the horizontal plane operates on the trackball center, which was described above. In one embodiment, the trackball center stays fixed on the ground at all times. A grab-move translation, indicated by input from the second sensor set 406, in the vertical plane will modify the trackball parameters (i.e., radius and location on the surface) to achieve an apparent viewpoint translation in the virtual plane. For example, the participant grabs the world, and then moves his hand down and releases the grab gesture. The corresponding action in the VE is that the world is lowered with respect to the viewpoint. The trackball center stays at the same position since no horizontal grab-move translation was involved. The viewpoint also stays at the same horizontal position. To accommodate for the elevated viewpoint, the radius of the trackball and the angle between the ground and a ray from the trackball center to the viewpoint are increased.

Figure 5:
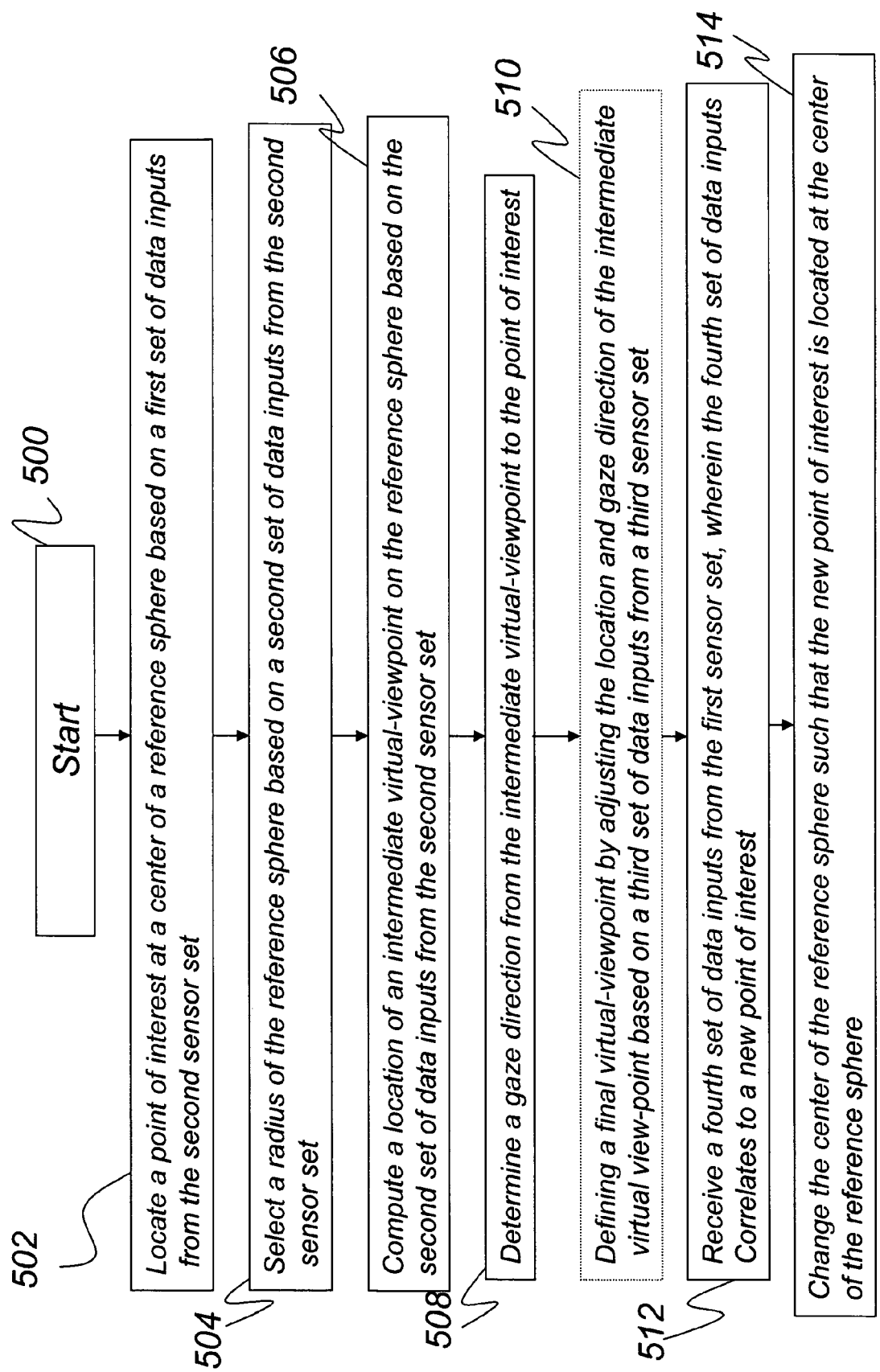
FIG. 5 is a flow diagram of one aspect of the present invention.

The graphics subsystem 410 performs a variety of acts in order to change the virtual viewpoint in response to the participant's movements in the real world. As shown in FIG. 5, after the start 500 of the technique, an act of locating 502 a point of interest at a center of a reference sphere based on a first set of data inputs from the second sensor set 406 (shown in FIG. 4) is performed. Next, an act of selecting 504 a radius of the reference sphere based on a second set of data inputs from the second sensor set 406 (shown in FIG. 4) is performed. Subsequently, an act of computing 506 an intermediate virtual-viewpoint on the reference sphere based on the second set of inputs is performed. Next, an act of determining 508 a gaze direction from the intermediate virtual-viewpoint to the point of interest is performed. Subsequently, an optional act of defining 510 a final virtual-viewpoint by adjusting the location and gaze direction of the intermediate virtual-viewpoint based on a third set of data inputs from the optional third sensor set 408 (shown in FIG. 4) is performed. Next, an act of receiving 512 a fourth set of data inputs from the first sensor set 404 is performed, wherein the fourth set of data inputs correlates to a new point of interest. Finally, an act of changing the center of the reference sphere is performed such that the new point of interest is located at the center of the reference sphere.

(5) System Details—Immersive Navigation

One skilled in the art will appreciate that the following description is provides just one of many different ways that the above described system and method may be implemented in pseudo-code.

Figure 6:
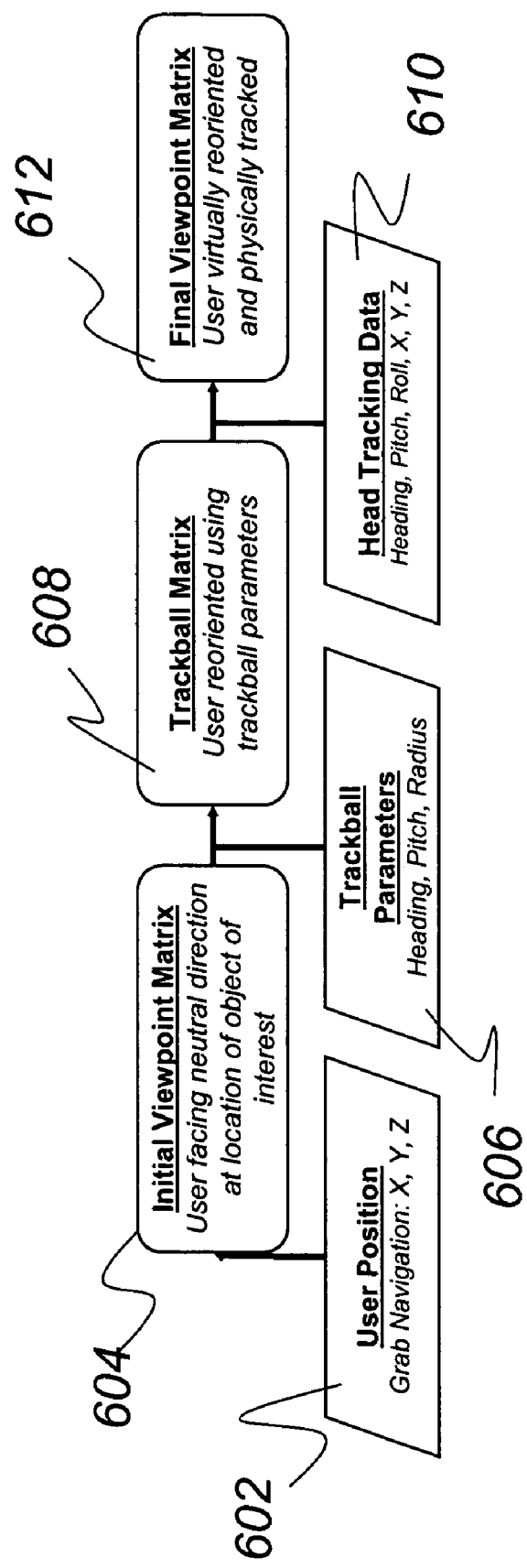
FIG. 6 is a flow diagram of how the various inputs are used to form various matrices in one embodiment of the present invention.

FIG. 6 depicts one embodiment of how the various inputs from the sensor sets 404, 406, 408 (shown in FIG. 4) can be incorporated to change the virtual viewpoint. In one embodiment, the act of locating 502 (shown in FIG. 5) comprises an act of determining the user's position in the virtual world through the grab navigation parameters X, Y, and Z 602. These parameters are used to form the initial viewpoint matrix 604.

Figure 7:
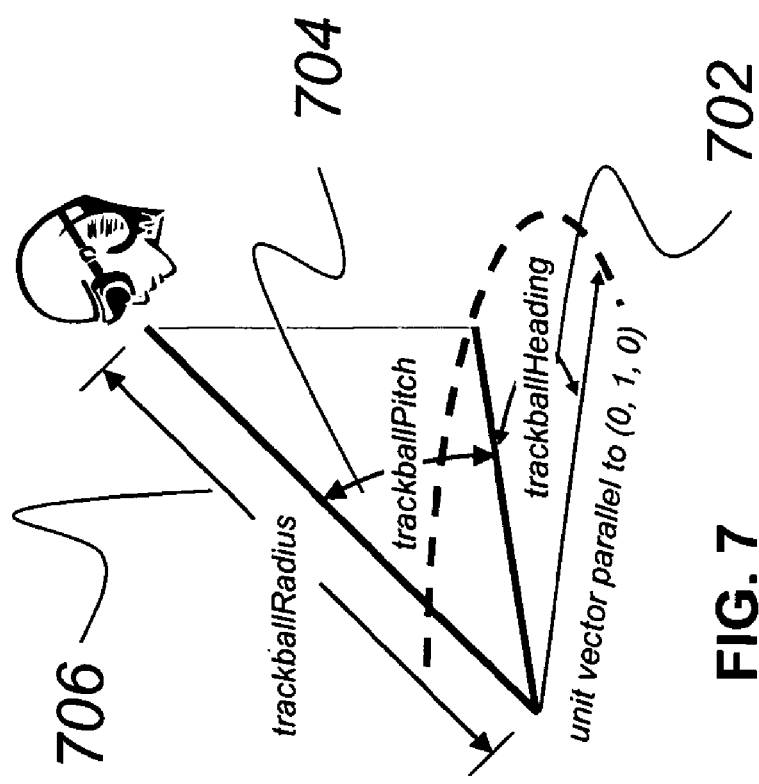
FIG. 7 depicts graphically the trackball orientation and radius in accordance with one aspect of the present invention.

The act of selecting a radius 504 (shown in FIG. 5) comprises an act of receiving the trackball parameters 606 from the second set of sensors 406 (shown in FIG. 4). The trackball center position is defined as a vector comprising trackballX, trackballY, and trackballZ, each of the vector components being distances. FIG. 7 depicts, graphically, the trackball orientation and radius. Trackball orientation and radius is defined as a vector comprising trackballHeading 702 which is an angle, trackballPitch 704, which is also an angle, and trackballRadius 706, which is a distance.

Figure 8:
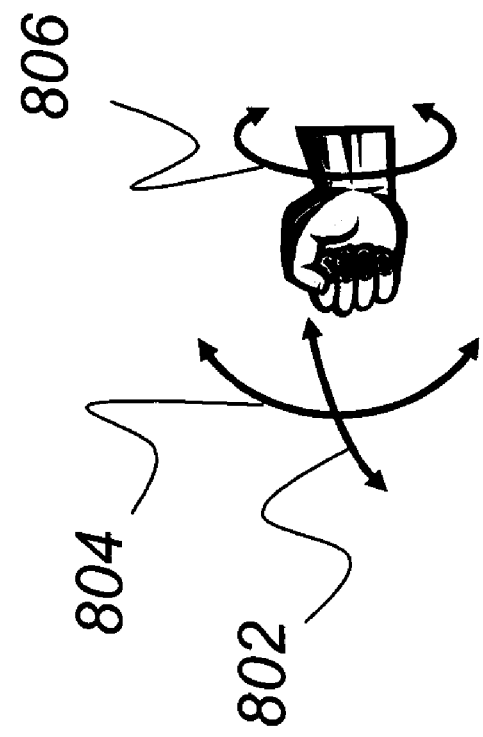
FIG. 8 depicts various wrist movements in accordance with one aspect of the present invention.

In one embodiment, dynamic hand gestures are used to obtain input values for the trackball parameters. One skilled in the art will appreciate that these hand gestures are just an example of many different types of hand (or other body parts) gestures that can be used to implement the disclosed system and method. As shown in FIG. 8, the participant can adjust various parameters through the movement of his wrist. For example, the movement of the wrist can involve a left to right motion 802, and up-down motion 804, or a roll motion 806. These various motions 802, 804, and 806 can be used to change the trackball parameters.

In one embodiment, the participant may invoke a change in trackballHeading 702 by making a fist and pivoting the wrist at the elbow left and right 802. Likewise, the participant may change trackballPitch 704 by making a fist and pivoting his wrist at the elbow up and down 804. To change trackballRadius 706, the participant can make a fist and roll 806 his wrist toward or away from his body. One skilled in the art will appreciate that the values obtained by tracking the wrist may affect the trackball parameters directly, or control the speed or acceleration of the trackball parameters.

Figures 9, 10:
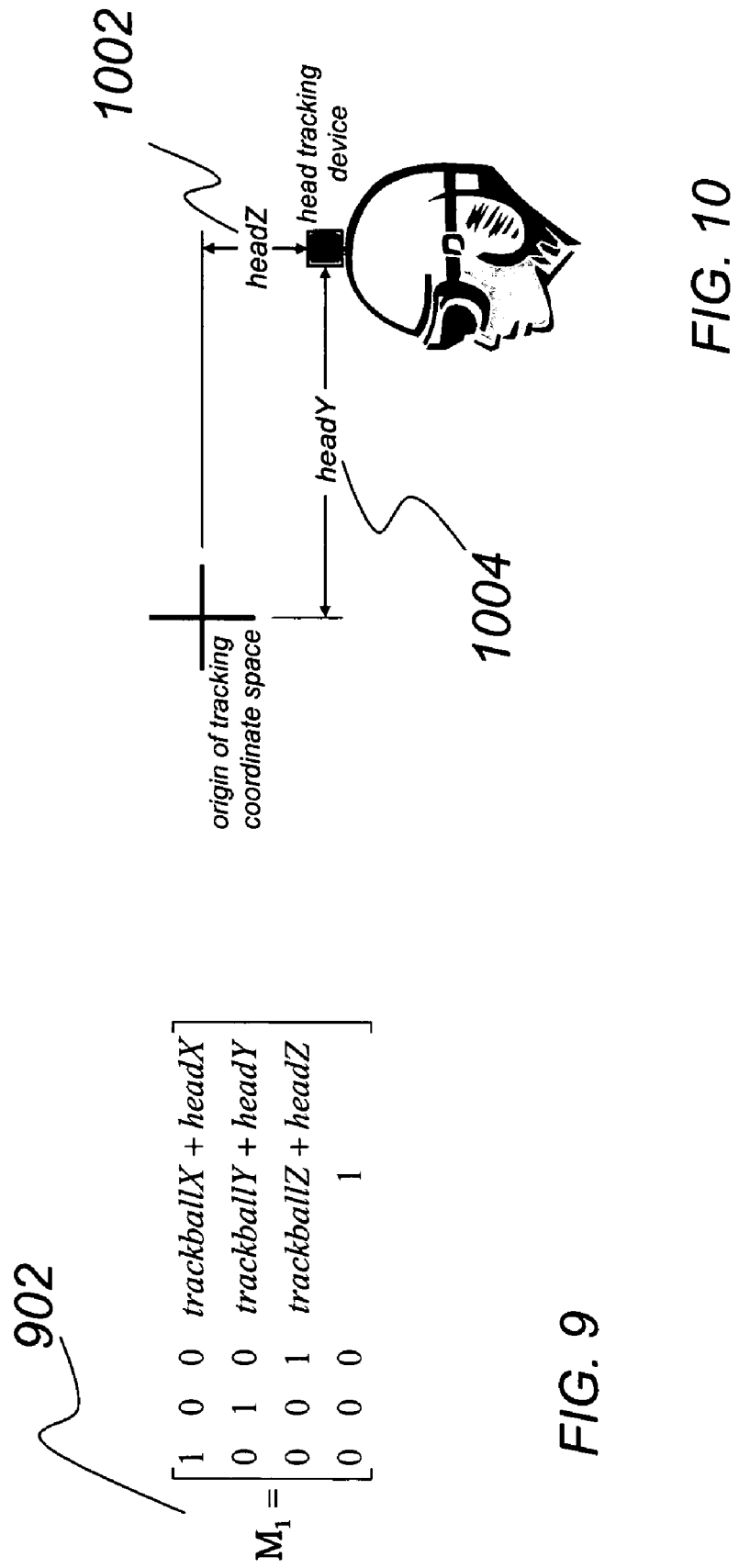
FIG. 9 depicts a translation matrix in accordance with one aspect of the present invention.
FIG. 10 depicts a right hand coordinate system for the head tracking system in accordance with one aspect of the present invention.

Once the various input variables are defined and provided, the act of locating 502 (shown in FIG. 5) further comprises an act of constructing a translation matrix 902, shown in FIG. 9, to position the viewpoint at the center of the trackball, offset by the participant's physical location, relative to a physical origin in the tracking space.

Subsequently, the act of computing a location 506 (shown in FIG. 5) is performed. In one embodiment the act of computing a location 506 comprises changing the position of the viewpoint, i.e., forming the trackball matrix 608 (shown in FIG. 6) based on trackball parameters 606 using pre-multiplication of 4×4 matrices. For example:

Matrix $M_2=R_1M_1$, where $R_1$ rotates by -trackballHeading about (0,0,1).

Matrix $M_3=R_2M_2$, where $R_2$ rotates by -trackballPitch about (1,0,0).

Matrix $M_4=TM_3$ where T translates by (0,trackballRadius,0).

Next, an act of determining a gaze direction 508 (shown in FIG. 5) is performed. The act of determining a gaze direction 508 comprises inputting head tracking data 610. Head position is defined as a vector comprising headX, headY, and headZ, each of the vector components being a distance. Head orientation is defined as a vector comprising headHeading, headPitch, and headRoll, each of the vector components being an angle. In one embodiment, a right hand coordinate system is assumed and headX is perpendicular to both headY 1004 and headZ 1006 as shown in FIG. 10. The parameters trackballX, trackballY, and trackballZ are in units of the virtual environment centered on some point or object of interest and the head tracking values are converted to the same units, although no necessarily linearly. The head tracking data 610 is also used to determine a new point of interest as described in the act of receiving a fourth set of data inputs 512 (shown in FIG. 5).

Next, a rotation matrix based on the head tracking data 610 is constructed by multiplying three 4×4 matrices representing the heading, pitch, and roll of the user's head. For example:
Matrix $M_5=RPH$, where R, P, and H are transforms for head-Roll, headPitch, and headHeading.

Additionally, the viewpoint is rotated by head orientation parameters with a pre-multiplication of the original translation matrix and the constructed orientation matrix. For example:

$$M_6=M_1M_5.$$

Next, the previously computed trackball position in matrix M4 is restored into the orientation matrix $M_6$. For example:

$$M_{6(3,0)}=M_{4(3,0)}$$

$$M_{6(3,1)}=M_{4(3,1)}$$

$$M_{6(3,2)}=M_{4(3,2)}$$

Finally, a hybrid viewpoint matrix 612, $M_6$ is applied to the display. The hybrid viewpoint matrix 612 is the result of performing the act of changing the center of the reference sphere 514 (shown in FIG. 5).

Figure 11B:
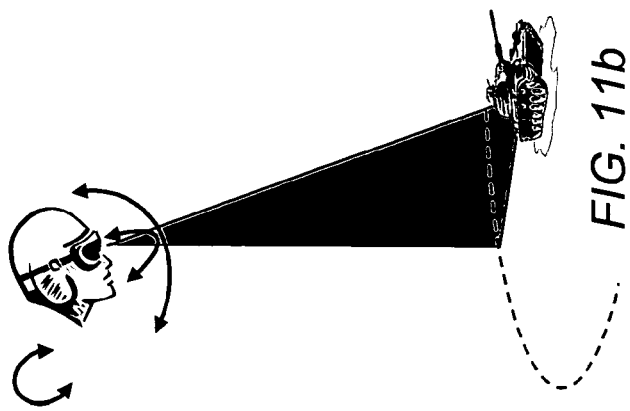
FIGS. 11a-11d depict the virtual and real-world results of the hybrid viewpoint matrix in accordance with one aspect of the present invention.
Figure 11D:
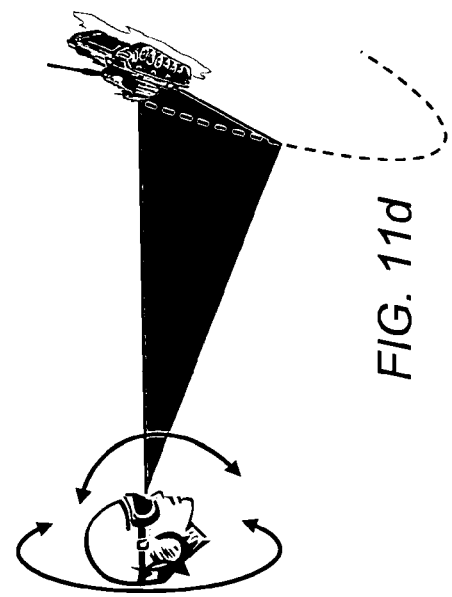
Figure 11A:
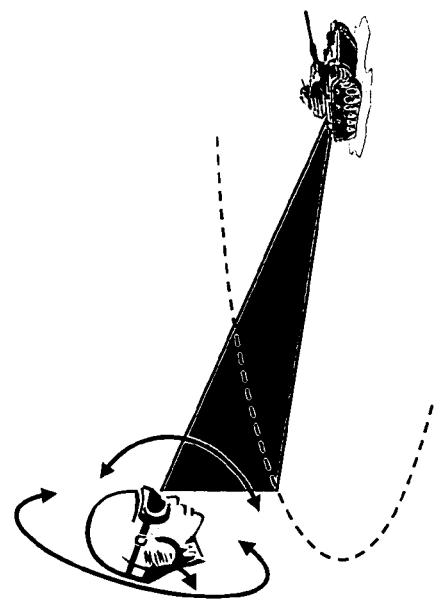

FIGS. 11a-11d depict the virtual and real-world results of the hybrid viewpoint matrix. In the physical world, the participant effectively pulls the virtual world around himself by manipulating the trackball parameters. For example, the participant can adjust the trackballPitch with a movement of the wrist. FIG. 11a illustrates the participant's viewpoint in the virtual world before the adjustment of the trackballPitch parameter, and FIG. 11b illustrates the participant's viewpoint in the virtual world after the adjustment of the trackballPitch parameter.

Figure 11C:
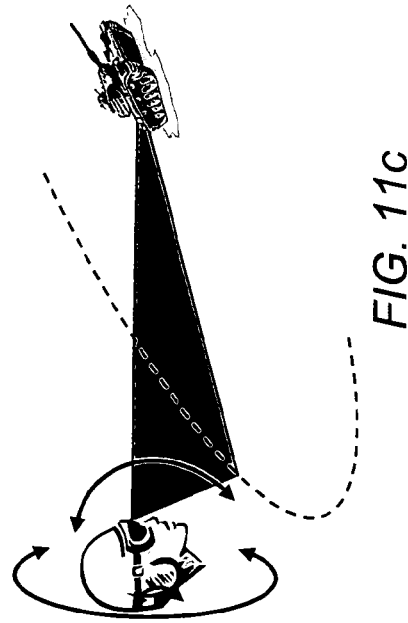

Although the virtual viewpoint of the participant has changed, FIGS. 11c and 11d illustrate that the participant's head in the real world has not moved, and the participant is still looking forward. FIG. 11c depicts the participant's real-world head position before the adjustment of the trackballPitch parameter, and FIG. 11d illustrates the participant's real-world head position after the adjustment of the trackballPitch parameter. The arrows depict that at all times the participant is able to turn his head naturally to view other objects in the virtual environment relative to a vector form the viewing position to the object of interest.

(6) System Overview—Selection and Pointing

The present invention allows a user to indicate and select individual or multiple objects in a virtual environment through a ray casting approach with significantly increased accuracy. However, the novel aspect of the invention is the method of controlling a cursor by mapping the differential angle orientations of two body parts. In one aspect of the invention, head and hand orientation data is incorporated directly into the computation of a user selection, effectively making it possible for a user to make selections with either the head or hand. To indicate a single point or object of interest, the user makes a static pointing gesture with the user's hand. In addition, the user indicates multiple objects of interest by sweeping the pointing gesture across the field of view. In one embodiment of the present invention, the user's head and hand are tracked to provide input to the system to reposition a cursor on a display. When the user invokes a selection action, such as a special gesture, key press, or spoken command a ray or frustum is cast from the user's viewpoint through the cursor in an imaginary plane perpendicular to the viewpoint. Objects intersected by the ray or within the frustum are marked as selected and some action is performed.

Essentially, the present invention accepts input from a three-dimensional input device, constrains the input to two degrees of freedom and applies constrained, two-dimensional selection techniques to three-dimensional environments.

The present invention makes it easy to select and point in a three-dimensional environment using a two-dimensional metaphor. The constrained input makes it easier to control, giving the user very high accuracy for making selections and indicating points of interest. Linking the cursor control to the head and hand angles adapts the techniques to a virtual environment in which the display's viewpoint is controlled by user head movement. This approach works well with any generalized navigation metaphor because control of the cursor is independent of the viewpoint.

Figure 12:
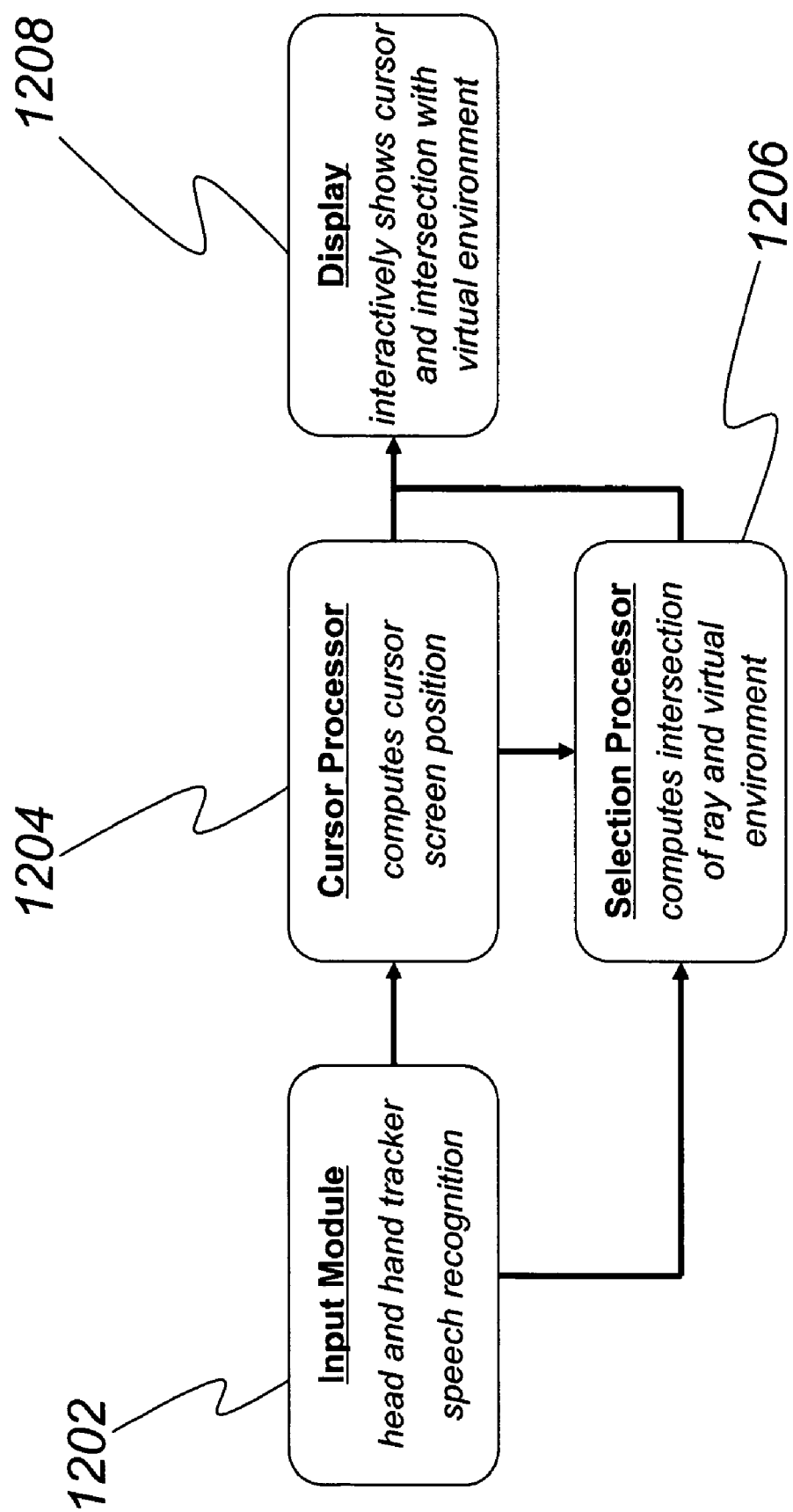
FIG. 12 is a flow diagram of one embodiment of the present invention, demonstrating how an input module feeds data to a cursor processor and selection processor, which interactively shows the information on a display.

One embodiment of the present invention is illustrated in the diagram in FIG. 12. The input module 1202 tracks the head and hand angles, hand gestures, and speech inputs of a user. The cursor processor 1204 computes the position of a cursor in the two orthogonal dimensions of a raster display. The cursor (not pictured) moves in a plane perpendicular to the line of sight of the user. The selection processor 1206 computes intersections of a ray cast through the cursor with objects and terrain in the virtual environment. Finally, the display 1208 represents the results of intersections to the user relative to his tracked head orientation.

Figure 13:
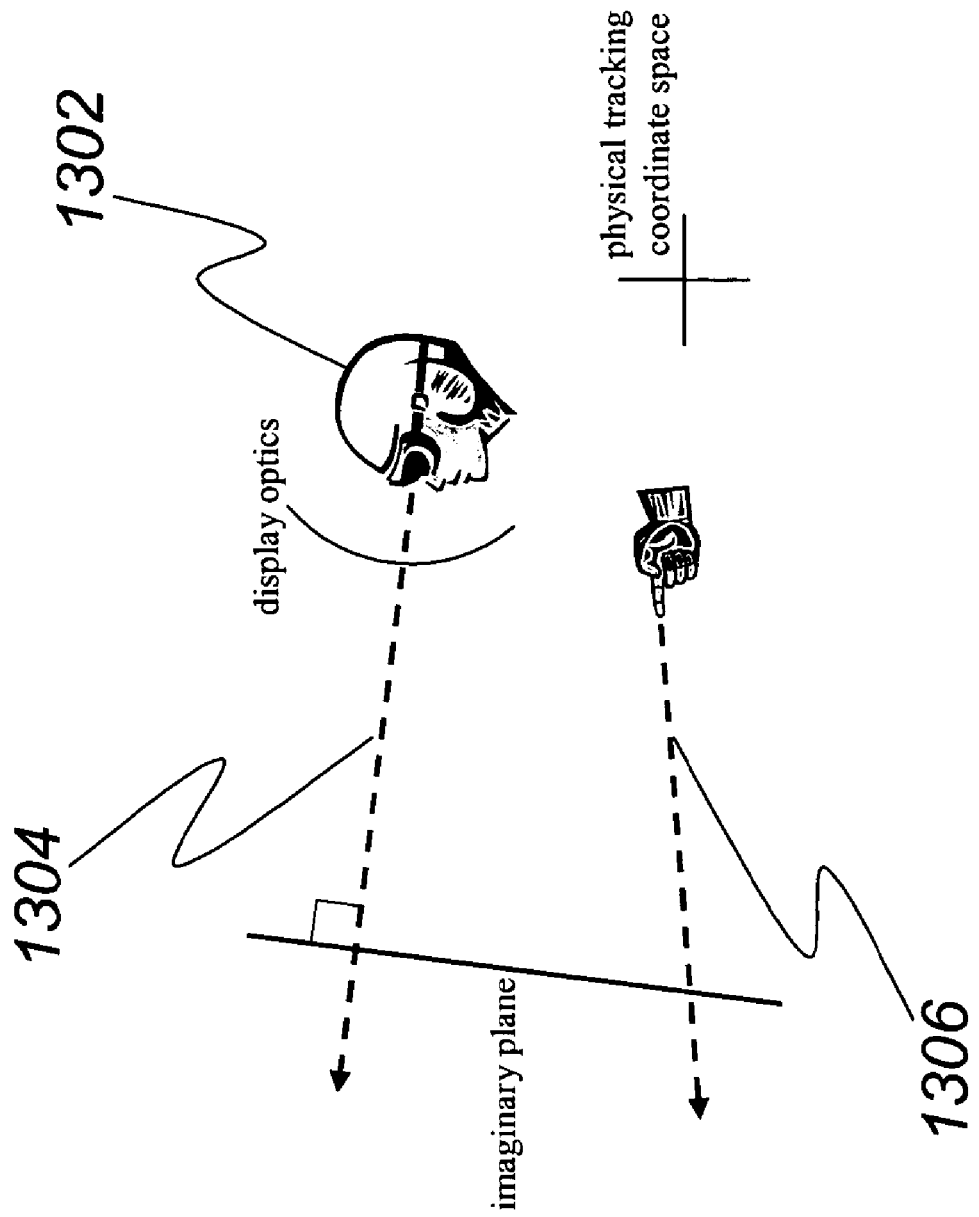
FIG. 13 is an illustration of one embodiment of the present invention, demonstrating how a user selection is determined from both hand and head orientations.

FIG. 13 illustrates how a user 1302 indicates a selection by pointing. Regardless of where the user 1302 looks, the user's selection is computed based on his head orientation 1304 and hand orientation 1306.

(7) System Details—Selection and Pointing

Figure 14:
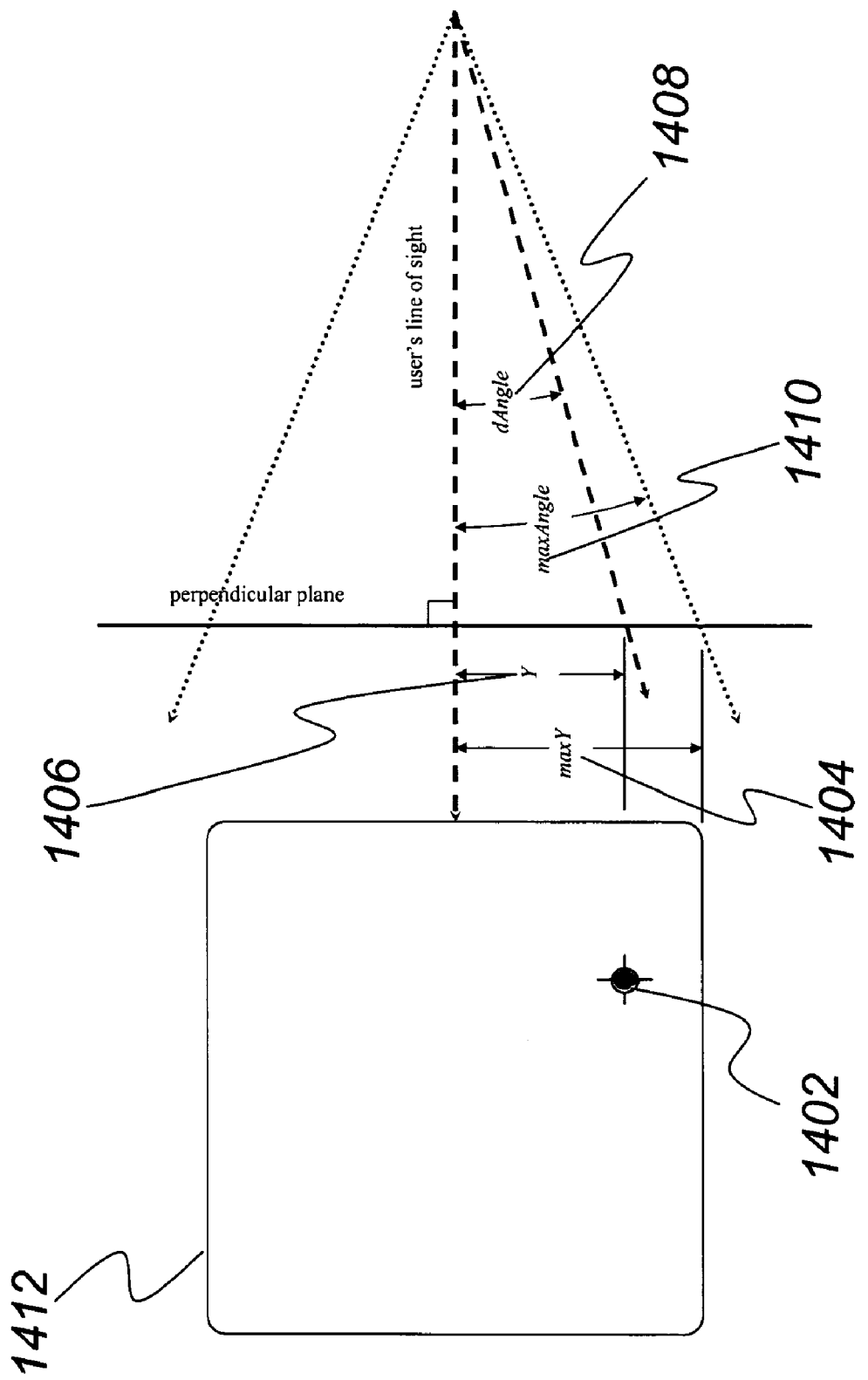
FIG. 14 is an illustration of one embodiment of the present invention, demonstrating how a cursor position is determined as a proportion.

When the user is indicating objects or points of interest in the distance, the head and hand be considered coincident. The distance separating the head and hand is insignificant compared to the distance between either body part to the object. Therefore, the head and hand may be considered to be at approximately the same position for the purposes of the following computations. FIG. 14 illustrates how the cursor position 1402 is computed as a proportion, where headAngle is the pitch angle of the head as reported by the tracking hardware, handAngle is the pitch angle of the hand as reported by the tracking hardware, maxY 1404 is ½ the height of the screen in pixels, Y 1406 is the computed position of the cursor in pixels, dAngle 1408 is equal to the handAngle minus the headAngle, and maxAngle 1410 is a constant defining the maximum angle that corresponds to ½ the screen height of the screen 1412, usually the ½ vertical field of view, but other angles may be used.

The cursor position 1402 is computed as a proportion of the differential angle of the user's head and hand orientation and a constant maxAngle 1410 that corresponds to the height of the screen 1412 as measured from its center. The equation below represents the computation of the cursor position 1402:

$$\frac{Y}{maxY} = \frac{handAngle - headAngle}{maxAngle}$$

The X coordinate is computed in the same manner, using heading values for the head and hand. The cursor is rendered at the computed position.

Figure 15:
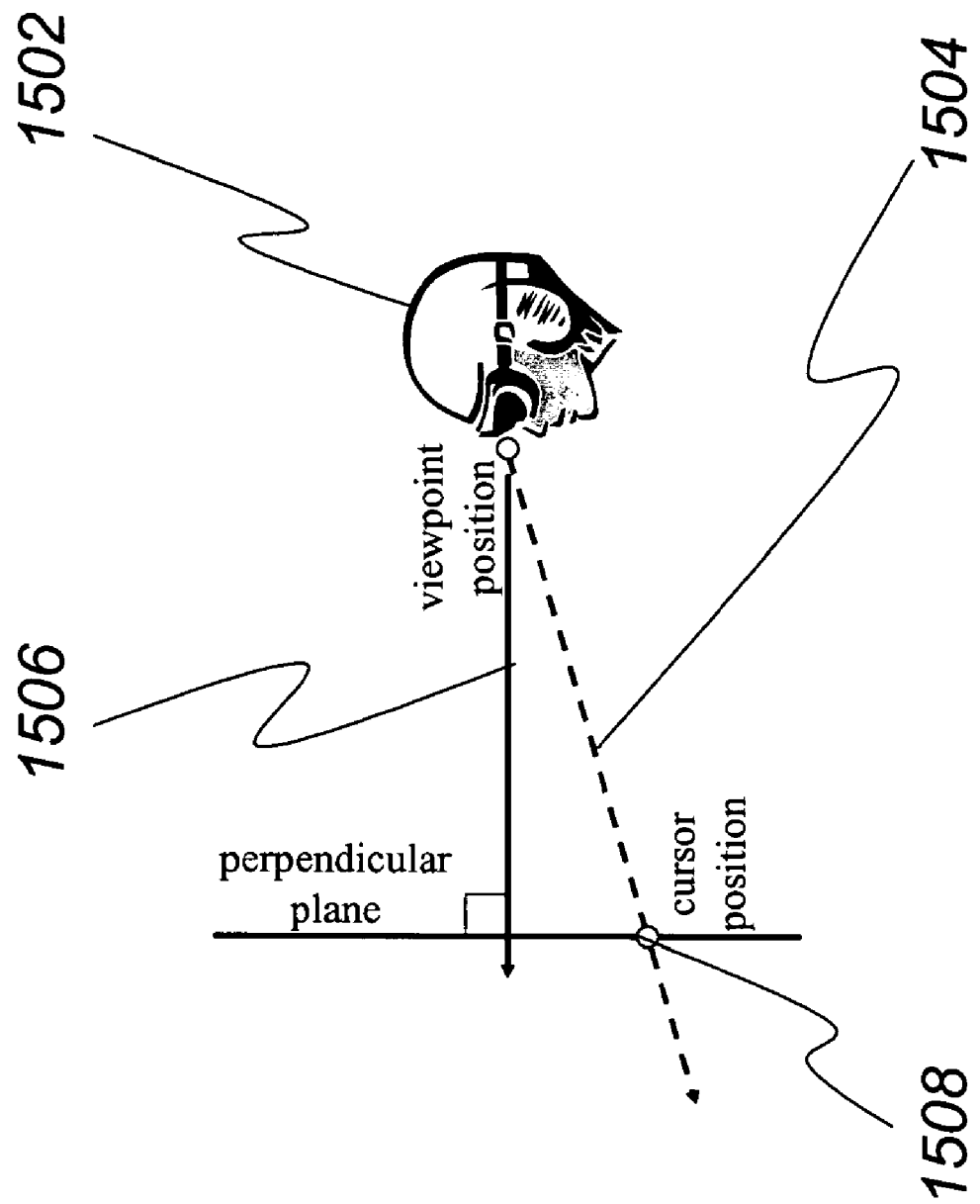
FIG. 15 is an illustration of one embodiment of the present invention, demonstrating how a ray is cast from a viewpoint position of a user through the cursor position to indicate a user selection.

FIG. 15 illustrates that when the user 1502 indicates a selection either by speech or a new gesture, the selection processor computes an intersection by constructing a ray 1504 from the user's viewpoint 1506 through the cursor 1508 into the virtual environment. An intersection test with each object, including the terrain, determines which objects were selected and the three-dimensional intersection point. A polygonal approximation of the terrain is acceptable.

Figure 16:
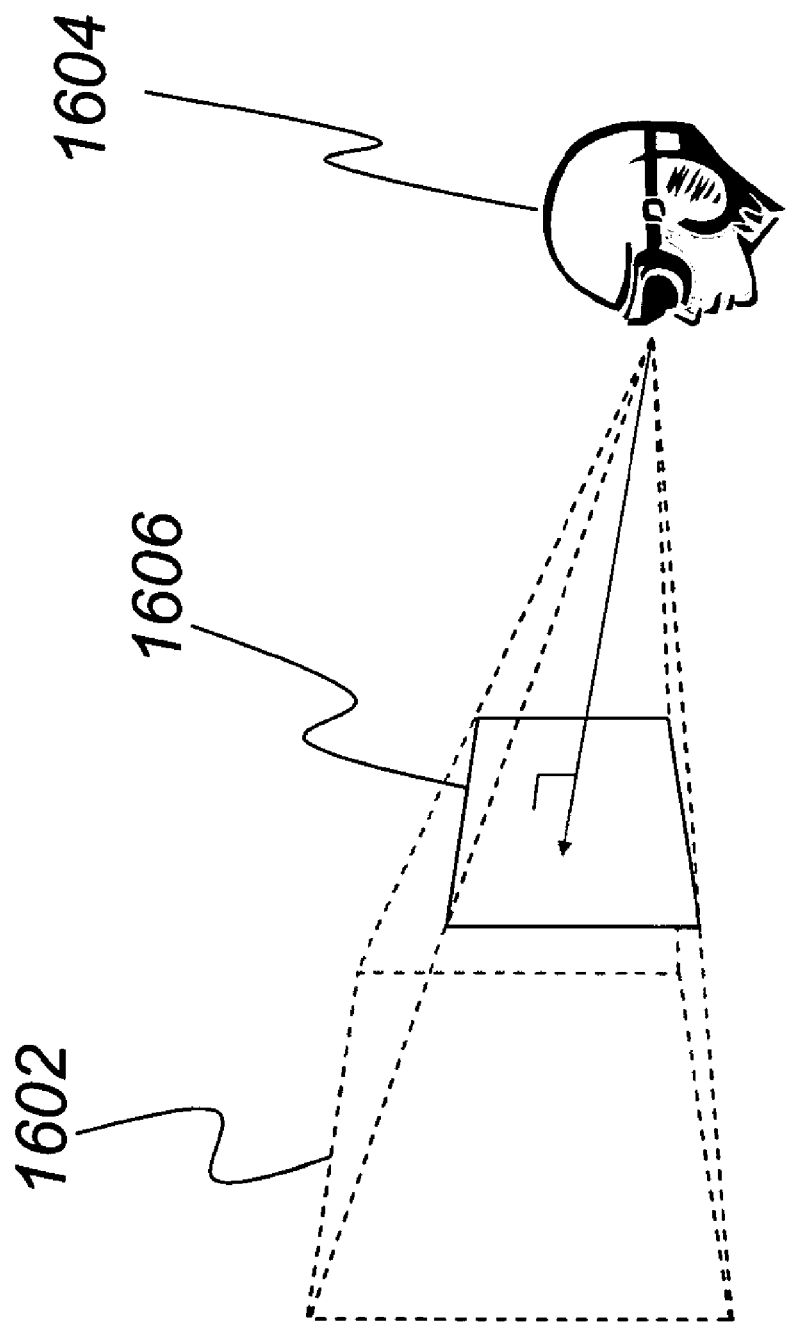
FIG. 16 is an illustration of one embodiment of the present invention, demonstrating how a frustum is used to form the boundary for selecting multiple objects.

Multiple selections are made with a "select and drag" motion. The user indicates a corner of a rectangle in the perpendicular plane by pointing and gesturing. In one embodiment, selection is made by a pointing gesture with thumb extended followed by a pointing gesture with thumb tucked to indicate the first corner. With the thumb still tucked, the user sweeps out a rectangle. When he is finished, the thumb is extended, marking the second corner. As illustrated in FIG. 16, the rectangle 1602 is projected into the environment from the viewpoint of the user 1604, forming a frustum 1606. Any objects within the frustum are selected.

In a general embodiment, the relative hand and head position is included in the computation of the cursor position. The result will increase accuracy for selection of objects near the user. Additionally, a user-defined threshold distance could determine whether the relative position is used or not.

Other body parts could provide the input in place of the hand. Relative changes in foot or shoulder angles could control movement of the cursor. There are trackers for gaze direction that could produce angle measurements of the user's eyes relative to the head.

What is claimed is:

1. A system for enabling user interaction with objects in a virtual environment independently of apparent virtual viewpoint altitude, by non-linearly scaling the virtual actuator, the system comprising a processor and a memory coupled with the processor, wherein the memory includes means that are executable by the processor for causing the processor to perform operations of:

receiving input, at a graphics subsystem, from a virtual environment processing subsystem and a real-world environment tracking subsystem, where the virtual environment processing subsystem provides a virtual-viewpoint position and a virtual actuator position, and the real-world environment tracking subsystem provides a real-viewpoint position and a real-actuator position, the graphics subsystem performing operations of:

receiving, at a xy-scale factor module, the virtual-viewpoint position and outputting, from the xy-scale factor module, a xy-scale-factor based on the virtual-viewpoint position; and receiving, at a non-linear mapping module, the virtual-viewpoint position, the virtual-actuator position, the real-viewpoint position, the real-actuator position, and the xy-scale-factor and generating, at the non-linear mapping module, a non-linear mapping between a real dataset and a virtual dataset, wherein the non-linear mapping is based on the xy-scale-factor, and wherein the real dataset comprises the real-actuator position and the real-viewpoint position in the real-world environment, and the virtual dataset comprises the virtual-actuator position and the virtual-viewpoint position in the virtual environment.

2. A system for enabling user interaction with objects in a virtual environment as set forth in claim 1, wherein the non-linear mapping comprises coordinates for a new virtual actuator position, and the coordinates are sent to the virtual environment processing subsystem, where the virtual environment processing subsystem calculates a new virtual actuator position based on the coordinates.

3. A system for enabling user interaction with objects in a virtual environment as set forth in claim 2, wherein the graphics subsystem further performs operations of receiving, at a z-scale factor module, the new virtual-actuator position and outputting, from the z-scale factor module, a z-scale-factor based on the new virtual-actuator position, and wherein the non-linear mapping module performs an operation of generating a non-linear mapping between the real dataset and the virtual dataset based on the xy-scale-factor and the z-scale factor.

4. A system for enabling user interaction with objects in a virtual environment as set forth in claim 3, wherein the xy-scale factor module performs an operation of calculating a vertical distance of the virtual-viewpoint position to a virtual ground plane and calculates the xy-scale factor by $$xy\text{-scale-factor} = \frac{maxReachDistance - armLength}{armLength^2}$$

where
maxReachDistance denotes twice the vertical distance of the virtual-viewpoint position to a virtual ground plane; and
armLength denotes maximum distance between the real-viewpoint position and the real-actuator position, when a user fully extends the real-actuator.

5. A system for enabling user interaction with objects in a virtual environment as set forth in claim 4, wherein the non-linear mapping module performs an operation of setting a threshold such that the non-linear mapping is generated when the vertical distance of the virtual-viewpoint position to a virtual ground plane is greater than the distance between the real-viewpoint position and the real-actuator position.

6. A system for enabling user interaction with objects in a virtual environment as set forth in claim 5, wherein the actuator is selected from a group consisting of a user's hand, a virtual craft, a cursor, a joystick, a computer mouse, and a pointer.

7. A system for enabling user interaction with objects in a virtual environment as set forth in claim 1, wherein the xy-scale factor module performs an operation of calculating a vertical distance of the virtual-viewpoint position to a virtual ground plane and calculates the xy-scale factor by $$xy\text{-scale-factor} = \frac{maxReachDistance - armLength}{armLength^2}$$

where
maxReachDistance denotes twice the vertical distance of the virtual-viewpoint position to a virtual ground plane; and
armLength denotes maximum distance between the real-viewpoint position and the real-actuator position, when a user fully extends the real-actuator,
and wherein the non-linear mapping module performs an operation of setting a threshold such that the non-linear mapping is generated when the vertical distance of the virtual-viewpoint position to a virtual ground plane is greater than the distance between the real-viewpoint position and the real-actuator position.

8. A computer implemented method for enabling user interaction with objects in a virtual environment independently of apparent virtual viewpoint altitude, by non-linearly scaling the virtual actuator, the method comprising an act of causing a processor to perform operations of:
receiving a virtual-viewpoint position and a virtual actuator position from a virtual environment processing subsystem, and receiving a real-viewpoint position and a real-actuator position from a real-world environment tracking subsystem;
calculating a xy-scale factor based on the virtual-viewpoint position; and
calculating a non-linear mapping between a real dataset and a virtual dataset based on the xy-scale-factor, and wherein the real dataset comprises the real-actuator position and the real-viewpoint position in the real-world environment, and the virtual dataset comprises the virtual-actuator position and the virtual-viewpoint position in the virtual environment.

9. A method for enabling user interaction with objects in a virtual environment as set forth in claim 8, wherein in the operation of calculating a non-linear mapping, the non-linear mapping comprises coordinates for a new virtual actuator position, and the coordinates are sent to the virtual environment processing subsystem, where the virtual environment processing subsystem calculates a new virtual actuator position based on the coordinates.

10. A method for enabling user interaction with objects in a virtual environment as set forth in claim 9, further comprising an operation of calculating a z-scale factor based on the new virtual-actuator position, and wherein the operation of calculating a non-linear mapping calculates a non-linear mapping between the real dataset and the virtual dataset based on the xy-scale-factor and the z-scale factor.

11. A method for enabling user interaction with objects in a virtual environment as set forth in claim 10, wherein the operation of calculating a xy-scale factor calculates a vertical distance of the virtual-viewpoint position to a virtual ground plane and calculates the xy-scale factor by $$xy\text{-scale-factor} = \frac{maxReachDistance - armLength}{armLength^2}$$

where
maxReachDistance denotes twice the vertical distance of the virtual-viewpoint position to a virtual ground plane; and
armLength denotes maximum distance between the real-viewpoint position and the real-actuator position, when a user fully extends the real-actuator.

12. A method for enabling user interaction with objects in a virtual environment as set forth in claim 11, wherein the operation of calculating a non-linear mapping sets a threshold such that the non-linear mapping is generated when the vertical distance of the virtual-viewpoint position to a virtual ground plane is greater than the distance between the real-viewpoint position and the real-actuator position.

13. A method for enabling user interaction with objects in a virtual environment as set forth in claim 12, wherein the actuator is selected from a group consisting of a user's hand, a virtual craft, a cursor, a joystick, a computer mouse, and a pointer.

14. A method for enabling user interaction with objects in a virtual environment as set forth in claim 8, wherein the operation of calculating a xy-scale factor calculates a vertical distance of the virtual-viewpoint position to a virtual ground plane and calculates the xy-scale factor by $$xy\text{-scale-factor} = \frac{maxReachDistance - armLength}{armLength^2}$$

where
maxReachDistance denotes twice the vertical distance of the virtual-viewpoint position to a virtual ground plane; and
armLength denotes maximum distance between the real-viewpoint position and the real-actuator position, when a user fully extends the real-actuator,
and wherein the operation of calculating a non-linear mapping sets a threshold such that the non-linear mapping is generated when the vertical distance of the virtual-viewpoint position to a virtual ground plane is greater than the distance between the real-viewpoint position and the real-actuator position.

15. A computer program product for enabling user interaction with objects in a virtual environment independently of apparent virtual viewpoint altitude, by non-linearly scaling the virtual actuator, the computer program product comprising computer-readable means stored on a computer readable medium that are executable by a computer having a processor for causing the processor to perform the operations of:
receiving a virtual-viewpoint position and a virtual actuator position from a virtual environment processing subsystem, and receiving a real-viewpoint position and a real-actuator position from a real-world environment tracking subsystem;
calculating a xy-scale factor based on the virtual-viewpoint position; and
calculating a non-linear mapping between a real dataset and a virtual dataset based on the xy-scale-factor, and wherein the real dataset comprises the real-actuator position and the real-viewpoint position in the real-world environment, and the virtual dataset comprises the virtual-actuator position and the virtual-viewpoint position in the virtual environment.

16. A computer program product for enabling user interaction with objects in a virtual environment as set forth in claim 15, wherein in the operation of calculating a non-linear mapping, the non-linear mapping comprises coordinates for a new virtual actuator position, and the coordinates are sent to the virtual environment processing subsystem, where the virtual environment processing subsystem calculates a new virtual actuator position based on the coordinates.

17. A computer program product for enabling user interaction with objects in a virtual environment as set forth in claim 16, further comprising an operation of calculating a z-scale factor based on the new virtual-actuator position, and wherein the operation of calculating a non-linear mapping calculates a non-linear mapping between the real dataset and the virtual dataset based on the xy-scale-factor and the z-scale factor.

18. A computer program product for enabling user interaction with objects in a virtual environment as set forth in claim 17, wherein the operation of calculating a xy-scale factor calculates a vertical distance of the virtual-viewpoint position to a virtual ground plane and calculates the xy-scale factor by $$xy\text{-scale-factor} = \frac{maxReachDistance - armLength}{armLength^2}$$

where
maxReachDistance denotes twice the vertical distance of the virtual-viewpoint position to a virtual ground plane; and
armLength denotes maximum distance between the real-viewpoint position and the real-actuator position, when a user fully extends the real-actuator.

19. A computer program product for enabling user interaction with objects in a virtual environment as set forth in claim 18, wherein the operation of calculating a non-linear mapping sets a threshold such that the non-linear mapping is generated when the vertical distance of the virtual-viewpoint position to a virtual ground plane is greater than the distance between the real-viewpoint position and the real-actuator position.

20. A computer program product for enabling user interaction with objects in a virtual environment as set forth in claim 15, wherein the operation of calculating a xy-scale factor calculates a vertical distance of the virtual-viewpoint position to a virtual ground plane and calculates the xy-scale factor by $$xy\text{-scale-factor} = \frac{maxReachDistance - armLength}{armLength^2}$$

where
maxReachDistance denotes twice the vertical distance of the virtual-viewpoint position to a virtual ground plane; and
armLength denotes maximum distance between the real-viewpoint position and the real-actuator position, when a user fully extends the real-actuator,
and wherein the operation of calculating a non-linear mapping sets a threshold such that the non-linear mapping is generated when the vertical distance of the virtual-viewpoint position to a virtual ground plane is greater than the distance between the real-viewpoint position and the real-actuator position.

\* \* \* \* \*